United States Patent
Shimizu et al.

(10) Patent No.: US 7,082,921 B2
(45) Date of Patent: Aug. 1, 2006

(54) FUEL INJECTION VALVE AND DIRECT-INJECTION ENGINE WITH THE SAME

(75) Inventors: Shuuichi Shimizu, Higashiibaraki (JP); Takuya Shiraishi, Hitachinaka (JP); Motoyuki Abe, Niihari (JP); Masahiko Hayatani, Hitachinaka (JP); Kouji Shibata, Tokyo (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/835,076

(22) Filed: Apr. 30, 2004

(65) Prior Publication Data

US 2004/0262431 A1  Dec. 30, 2004

(30) Foreign Application Priority Data

May 1, 2003 (JP) ............................. 2003-126587
Mar. 23, 2004 (JP) ............................. 2004-084176

(51) Int. Cl.
*F02M 61/18* (2006.01)

(52) U.S. Cl. ..................... 123/305; 123/298; 123/472; 239/533.4; 239/533.12; 239/533.14

(58) Field of Classification Search ................ 123/295, 123/298, 305, 472; 239/533.4, 533.12, 533.14
See application file for complete search history.

(56) References Cited

U.S. PATENT DOCUMENTS

| | | | | |
|---|---|---|---|---|
| 4,520,962 A | * | 6/1985 | Momono et al. | ........... 239/488 |
| 6,345,601 B1 | * | 2/2002 | Miyajima et al. | ........... 123/305 |
| 6,494,388 B1 | * | 12/2002 | Mueller et al. | ........ 239/533.14 |
| 6,588,399 B1 | * | 7/2003 | Okamoto et al. | ........... 123/305 |
| 2003/0006316 A1 | * | 1/2003 | Miyajima et al. | ...... 239/533.12 |

FOREIGN PATENT DOCUMENTS

| | | |
|---|---|---|
| JP | 11-159421 | 6/1999 |
| JP | 2000-329036 | 11/2000 |

* cited by examiner

*Primary Examiner*—Erick Solis
(74) *Attorney, Agent, or Firm*—Crowell & Moring LLP

(57) ABSTRACT

A fuel injection valve with high freedom to optimize the direction of fuel spray, the shape of spray, the length of penetration, the existence/absence of lead spray and the like, in correspondence with each type of internal combustion engine is provided. A swirling force about a central axis of an injection orifice is supplied by a swirler to fuel injected from the injection orifice. A central axis E of the injection orifice is slanted at a predetermined deflection angle to a central axis of a valve body. Further, a step portion is formed in an end surface of the injection orifice.

17 Claims, 16 Drawing Sheets

| | La: LONG | Lb: SHORT |
|---|---|---|
| NOZZLE STRUCTURE |  |  |
| NORMAL TEMPERATURE ATMOSPHERIC PRESSURE (20°C, 0.1MPa) | <br>PENETRATION: LONG | <br>PENETRATION: SHORT |
| HIGH TEMPERATURE HIGH PRESSURE (160°C, 0.5MPa) | <br>LEAD SPRAY EXISTS | <br>NO LEAD SPRAY |

INTAKE STROKE INJECTION

COMPRESSION STROKE INJECTION

FUEL INJECTION VALVE AND DIRECT-INJECTION ENGINE WITH THE SAME

CLAIM OF PRIORITY

The present application claims priority from Japanese application serial no. 2003-126587 filed on May 1, 2003 and Japanese application serial no. 2004-84176 filed on Mar. 23, 2004, the contents of which are hereby incorporated by reference into this application.

FIELD OF THE INVENTION

The present invention relates to a fuel injection valve used for fuel supply of an internal combustion engine and a direct-fuel injection type engine, namely an in-cylinder injection type engine with the fuel injection valve, and more particularly, to a fuel injection valve to swirl-inject fuel in a cylinder and a direct-fuel injection type engine with the fuel injection valve.

BACKGROUND OF THE INVENTION

In a direct fuel injection type engine, fuel is directly injected in each combustion chamber of the engine. As a fuel injection valve (hereinbelow, also referred to as an "injector") used for a gasoline-fuel direct-injection type engine, a fuel injection valve having a nozzle with a swirler is known. This fuel injection valve has an injection orifice for injecting fuel, a movable valve element for opening and closing said injection orifice by the motion of its axial direction, and a fuel swirling means for giving swirling force at the upper stream of said injection orifice to fuel passing through a fuel passage. The fuel swirling means, referred to as a swirler, gives a swirling force on the basis of the central axis of the injection orifice to fuel.

In prior arts of the fuel injection valve having nozzle with swirler, the following injection valves are proposed to make a fuel spray deflect in the predetermined direction or obtain a required the spray shape. For example, in one of them, the injection orifice is slanted with a predetermined deflection angle in relation to the central axis of the valve element (valve body), as described in Japanese Patent Laid-Open No. H 11(1999)-159421. In another of them, the outlet of the injection orifice is formed in the shape of a step namely difference in level, as described in Japanese Patent Laid-Open No. 2000-329036. The injection orifice having the step is formed in the direction according with the central axis of the valve element (the central axis of the injection valve body and the nozzle body).

As combustion forms of the direct fuel injection type engine, a stratified combustion form and a homogeneous combustion form are well known. The stratified combustion is a combustion style that a flammable air-fuel mixture layer having a ratio close to a theoretical air-fuel ratio is formed around an ignition plug for combustion. As the stratified combustion is utilized especially upon a lean burn mode which the air-fuel ratio is larger than the theoretical air-fuel ratio and mainly used upon the lower load driving and idle operations, low fuel consumption of the engine is attained. The homogeneous combustion is a combustion style that the air-fuel mixture in the combustion chamber is entirely made to be homogenized with the theoretical air-fuel ratio. The homogeneous combustion is suitable to middle- and high-load driving.

Optimized settings of the direction, the shape, the length of penetration and existence/absence of the lead spray etc. of the fuel spray injected in a cylinder by the fuel injection valve, is difference in dependence each type of internal combustion engine, namely in dependence of combustion styles, shapes of combustion chambers, relative positional relations between ignition plug and fuel injection valve, and the like. The above-mentioned penetration length means the reachable distance of the fuel spray injected from the injection valve. The lead spray means the maximum length spray area in the fuel spray.

In the conventional fuel injection valves, they have merely the deflection angle of injection orifice or the step of the outlet of the injection orifice. Accordingly, the optimization of the fuel spray direction, the spray shape, the penetration length, existence/absence of the lead spray in correspondence with each type of internal combustion engines is limited, and the optimized setting cannot be sufficiently made, in viewpoints of combustion performance, fuel economical efficiency and exhaust gas performance,.

In the respective viewpoints of combustion performance, fuel economical efficiency and exhaust gas performance, the present invention provides a fuel injection valve having excellent injection performance and a direct-fuel injection type engine with the fuel injection valve. That is, the present invention is to realize the high freedom in setting of the direction fuel spray, the spray shape, the penetration length, the lead spray etc. of the fuel spray, and to obtain the optimized fuel spray in correspondence with each type of internal combustion engines.

SUMMARY OF THE INVENTION (1) The fuel injection valve according to the present invention comprises an injection orifice (injection port) for injecting fuel, a movable valve element for opening and closing said injection orifice by the motion of its axial direction, and a fuel swirling means for giving swirling force to fuel passing through a fuel passage at the upper stream of the injection orifice. Wherein the injection orifice is slanted with a predetermined deflection angle in relation to the central axis of said valve element, and the outlet of the injection orifice is formed in the shape of a step.

According to the invention, as the injection orifice is slanted at a predetermined deflection angle on the basis of the central axis of the valve body, a fuel spray injected out from the injection orifice is deflected in correspondence with the deflection angle. Further, by the adjusting of axial length of the injection orifice in addition to the swirl-injection generated by swirler, the locally concentrated area (the most penetration area) of fuel at the outlet of the injection orifice can be set in an arbitrary position around the axis of the injection orifice. The shape and distribution of the fuel spray can be adjusted by the formation of the step (a difference in level) provided at the outlet of the injection orifice. By the combination of these settings, the operations depending on the respective settings work synergistically or cancel out each other, and various settings of the fuel spray direction, the spray shape, the penetration length and the existence/absence of lead spray can be made.

Further, in conjunction with the above features, the following invention is proposed.

The injection orifice has a deflection angle (slant angle) in relation to the central axis of the injection valve body, thereby a locally concentrating flow is made in swirling flow passing through its orifice, and the swirling flow of the fuel id guided the outlet side of the orifice. The outlet of said injection orifice is provided with a notch (the above-described step represents the notch). Further the position of the notch corresponds with the injection position of said locally concentrating flow.

The notch means here the shape that a part of the outlet of the injection orifice lacks. Means for forming the notch is not limited. For example, the notch is realized by cutting or pressing.

(2) The present invention has been created based on the following knowledge.

The inventors found that in an injector that a fuel swirler is provided at the upper stream of the fuel injection orifice, in a case where the orifice is deflected in relation to the axis of the injector, the fuel concentrated area (concentrated area of fuel flow amount) is locally formed in a fuel swirl flow passing through the orifice. The fuel concentrated area and the deflection direction of the orifice do not necessarily correspond with each other. The direction (position) of the concentrated area of the fuel flow at the outlet of the injection orifice is determined by the course of the swirling flow of the locally concentrated fuel to the outlet of the orifice from the inlet thereof. The final position of the course of the flow (position at the outlet of the injection orifice) depends on the length of the orifice. The fuel spray injected from a position of the fuel injection orifice corresponding with the course of the fuel concentration portion has a high flow speed and a high fuel spray density.

Further, the formation of notch provided at a part of the outlet of the fuel injection orifice by utilizing a step or the like means that the constraint of swirl fuel (constraint by an orifice wall surface) is quickly released at the notch. Thus the penetration of fuel spray (spray reachable distance) injected from the notch is remarkably increased.

Accordingly, it is acknowledged that, by making the notch of the injection orifice correspond with the fuel concentrated area at the outlet of the injection orifice, the penetration (reachable distance) of the fuel spray injected from the notch is remarkably increased, and the large lead spray is formed (the details will be described in "Detailed Description of the Preferred Embodiments").

(3) It may be arranged such that two faces composing the step are formed in parallel mutually. Namely each of the two faces at the outlet of the injection orifice is parallel to a reference plane having an arbitrary slant angle in relation to the central axis of the injection orifice. As one example, the two parallel faces of the step (a difference in level) include faces perpendicular to the central axis of the injection orifice.

Further, it may be arranged such that two faces composing the step are formed by cutting or pressing. The axial length of the injection orifice, the step shape of the outlet of the injection orifice, and the direction of the step can be arbitrarily set by cutting or pressing of the end surface of the injection orifice.

The direct-fuel injection type engine according to the present invention has the fuel injection valve according to the above inventions. In the direct-fuel injection type engine, the fuel spray direction, the spray shape, the penetration length, the lead spray and the like are set in correspondence with the relative positional relation between the ignition plug and the fuel injection valve by adjusting the axial length of the injection orifice, the step shape of the outlet of the injection orifice and the step direction. As a result, the engine combustion performance, the fuel economical efficiency and the exhaust gas performance can be improved.

The method of manufacturing the fuel injection valve according to the present invention is a method having the following processing of a nozzle member in the injection valve. The injection orifice, in primary product of the nozzle member, is made with a predetermined slant angle in relation to the central axis of the nozzle body and with a length including an adjustment margin. The length of the injection orifice is adjusted by cutting or pressing the outlet of the injection orifice. The step is formed at the outlet of the injection orifice after determining the direction of the step. Thus, the secondary product (a finished product) of the nozzle member of the injection valve is obtained. The nozzle member is for example a nozzle plate.

Accordingly, the fuel spray direction, the spray shape, the penetration length, the existence/absence of lead spray and the like, necessary in an internal combustion engine, can be optimized at the final stage of manufacture of the fuel injection valve.

DETAILED DESCRIPTION OF THE PREFERRED EMBODIMENTS

Preferred embodiments of the present invention will now be described in detail in accordance with the accompanying drawings.

Figure 1:
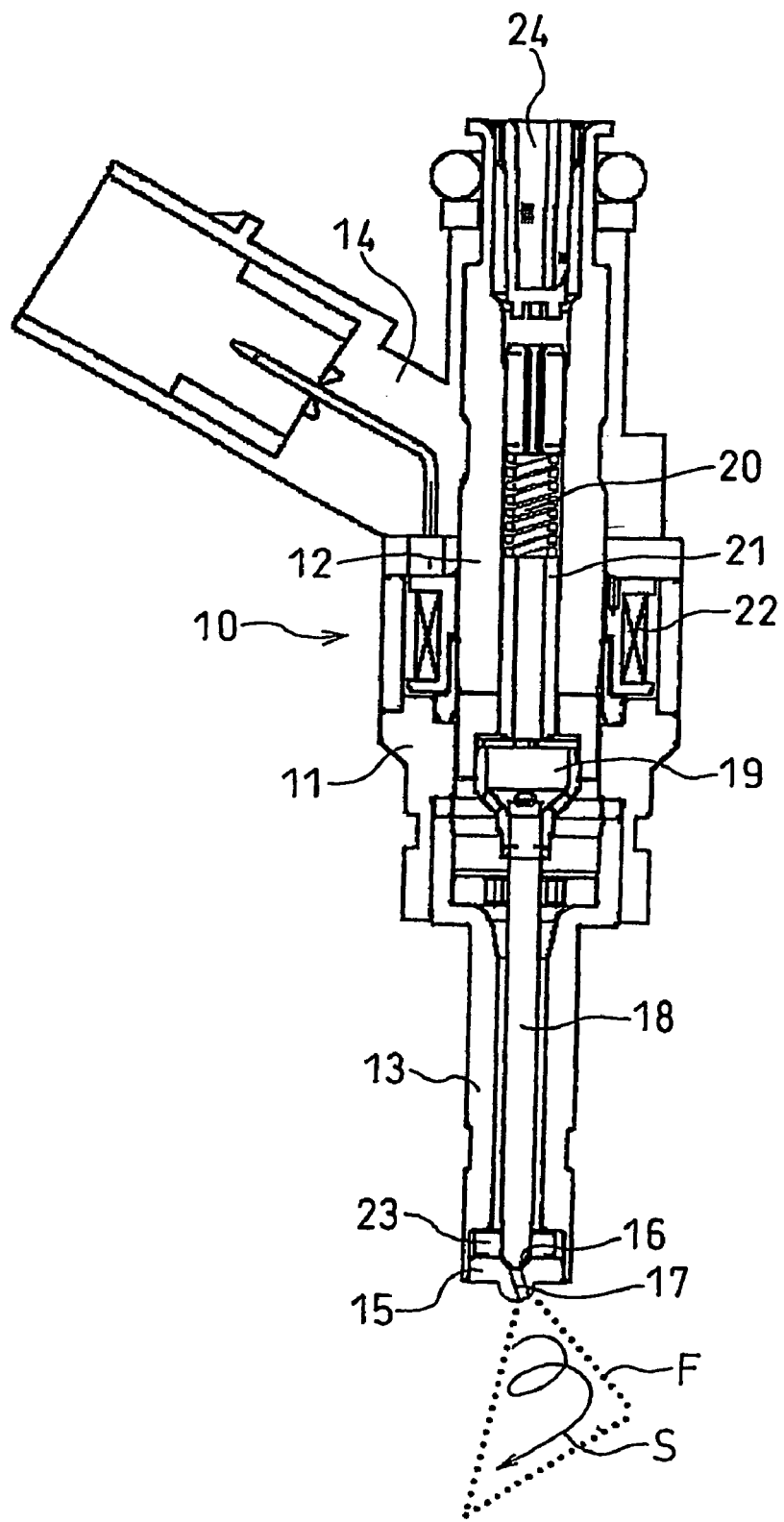
FIG. 1 is a cross-sectional view showing an embodiment of a fuel injection valve according to the present invention.

FIG. 1 shows one embodiment of a fuel injection valve according to the present invention.

A fuel injection valve (hereinbelow, referred to as an "injector") 10 has a main body, case (valve body) 11, a fuel passage member (also referred to as a "center core") 12, a nozzle body 13, a connector housing member 14 and the like. A fuel passage comprises the center core 12 and the nozzle body 13. A nozzle plate 15 is fixed to one end of the nozzle body 13. A valve seat 16 and an injection orifice 17 are formed in the nozzle plate 15.

A valve element (for example needle) 18 is provided movably in an axial direction in the nozzle body 13. The end of the valve element 18 is seated and detached on the valve seat surface 16 by its movement in the axial direction, thereby closed and opened the injection orifice 17. A plunger (movable core) 19 is connected to the valve element 18. A compression coil spring 20 is provided in the center core 12. The compression coil spring 20 gives a spring force to the valve element 18 toward the valve seat 16 side (in a valve closing direction) via the movable sleeve member 21 and the plunger 19.

An electromagnetic coil 22 is provided in the main body case 11. The electromagnetic coil 22 is excited by energization, thereby attracts the plunger 19 against the spring force of the compression coil spring 20, to move the valve element 18 away from the valve seat 16.

A swirler 23 as fuel swirling means is provided in the nozzle body 13. The swirler 23 is positioned on the valve seat 16 side in the nozzle plate 15. The swirler 23 gives a swirling force around the central axis of the injection orifice 17 to fuel passing through the fuel passage for the sake of fuel atomization.

A fuel supply port 24 of the injector 10 is supplied with fuel pressurized by a fuel pump (not shown). The fuel passes through an internal passage of the fuel passage member 12, the main body case 11 and the nozzle body 13 to the swirler 23 and is injected to the outside from the injection orifice 17 while the valve element 18 is away from the valve seat 16 by energization of the electromagnetic coil 22. As the swirling force is given to the fuel spray by the swirler 23, the fuel spray has a conical shape as indicated with a broken line F in FIG. 1, with a swirl flow S around the central axis of the injection orifice 17. The amount of fuel injection in the injector 10 is determined by a valve opening period of the valve element 18, i.e., the period of energization to the electromagnetic coil 22.

Figure 2:
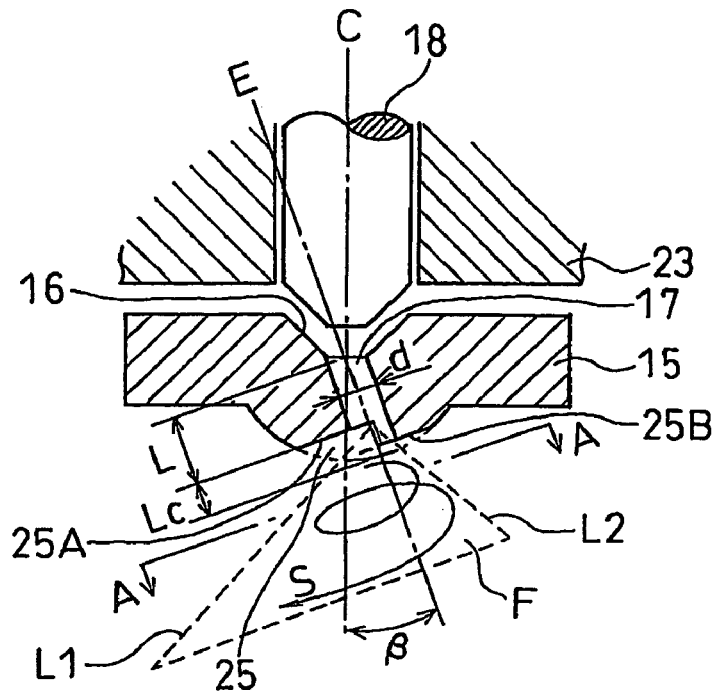
FIG. 2 is an enlarged cross-sectional view of a main part of the fuel injection valve according to the embodiment in FIG. 1.

FIG. 2 is an enlarged cross-sectional view of a main part of the injector 10 according to the embodiment. In the injector 10, the injection orifice 17 namely a central axis E thereof is slanted with a predetermined deflection angle β to a central axis C (equal to the central axis of the injector 10) of the valve element 18, and a step portion 25 is formed at the outlet of the injection orifice 17.

The step portion 25 is L shape type step in a sectional shape, and it comprises two mutually-parallel faces 25A and 25B formed at the outlet of the injection orifice 17 and the periphery around the outlet. The step has a difference in level in the direction of the central axis E of the injection orifice 17.

The central axis E of the injection orifice 17 is slanted at the deflection angle β in relation to the central axis C of the valve element 18, in other words, the injection orifice 17 is non-parallel to the axis of the injector 10. And the outlet face of the injection orifice 17 is formed in a plane approximately perpendicular to the central axis E of the injection orifice 17. Thereby, the fuel spray F is formed to be deflected on the basis of the axis of the injector 10, and the penetration length of the fuel spray F is nonuniform (L1/L2≠1).

The slant of the injecting orifice 17 in relation to the axis of the injector 10 assists the fuel which enters the injection orifice 17 from the valve seat 16 side in flowing in the deflection direction, while prevents the fuel from easily flowing in an opposite side to the deflection direction. According to this structure, the distribution comprising different axial-direction flow speeds of the fuel is generated in the injection orifice 17. The difference in the distribution of flow speed in the injection orifice 17 causes ununiformity of the penetration length of the fuel spray F.

Figure 3A:
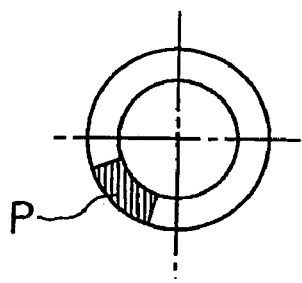
FIGS. 3A and 3B are schematic diagrams showing a long penetration area of fuel spray in a cross section along a line A—A in FIG. 2.
Figure 3B:
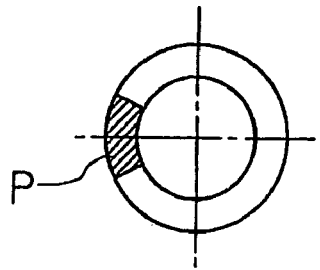

As the swirler 23 for giving a swirling force to the fuel is provided in the injector 10, the fuel flowing through the injection orifice 17 is swirled. As shown in FIGS. 3A and 3B (in the cross-sectional views along the line A—A in FIG. 2), an area with the maximum penetration length in the fuel spray F injected from the injection orifice 17 occurs in a position P shifted from a central position.

In direct-fuel injection gasoline engine for stratified combustion, optimum combustion can be attained with minimum fuel by directing the area P of the fuel spray F with the maximum penetration length to the direction of an ignition plug.

When the position of the fuel spray F with the maximum penetration length can be freely set by setting of an axial length L of the injection orifice 17, optimum combustibility can be obtained.

The relation between the axial length L of the injection orifice 17 and the position of the fuel spray F with the maximum penetration length will be described as follows. The fuel is swirled rightward by the swirler 23, passes through the valve seat 16 and enters the injection orifice 17. As the injection orifice 17 is positioned nonparallel (slanted) to the axis C of the injector 10, the fuel which enters the injection orifice 17 easily flows in the deflection direction but not easily flows in the opposite side to the deflection direction.

As a high axial-direction flow speed and a low axial-direction flow speed are included in the axial-direction flow speed of the fuel passing through the injection orifice 17, the nonuniform distribution of flow speed is generated in the orifice 17. As the fuel is always swirled rightward, the fuel passing through the injection orifice 17, with the high axial-direction flow speed and the low axial-direction flow speed, also swirling rightward in the injection orifice 17, moves to the exit of the injection orifice 17.

That is, the position of the fuel spray F with the long penetration length corresponds to the fuel spray portion injected from the area with a high axial-direction flow speed at the outlet of the injection orifice 17. Accordingly, the setting of the position of the fuel spray F with the long penetration length is determined by setting the position of the fuel inject portion with the high axial-direction flow speed of the fuel always swirling in the injection orifice 17.

The position (the position of the outlet of the injection 17 for injecting the portion with the high axial-direction flow speed of the fuel always swirling in the injection orifice 17) is determined by adjusting (setting) the axial length L of the injection orifice 17 namely adjusting a flow passage length of the injection orifice 17, thereby adjusting a turning angle of fuel flow to the outlet of the injection orifice from the inlet. By this structure, as shown in FIGS. 3A and 3B, the area P of the fuel spray F with long penetration length can be moved to a predetermined position of the outlet of the orifice 17 with swiring flow around the central axis in the cross section along the line A—A in FIG. 2 (viewing from the nozzle side).

The axial length L of the injection orifice 17 can be freely set with the amount of cutting Tc of cutting process of the end surface (the outlet) of the injection orifice. Assuming that the amount of cutting Tc is 0.1 mm and thereby the portion of the fuel spray F with the long penetration length is turned around by 8° in the cross-section along the line A—A (checked from the nozzle side), the relation between the amount of cutting Tc and a turning angle Pdeg of the penetration is represented by the following expression (1).

$$Pdeg=\{Tc\cdot\tan(\theta/2)\}/(\pi\cdot D)360 \quad (1)$$

In the above expression, $\theta$ is a main spray angle of the fuel spray F; $\pi$ is the ratio of the circumference of a circle to its diameter; and D is the diameter of the injection orifice 17.

In a case where the fuel spray F is designed, to determine necessary flow amount and main spray angle $\theta$, the diameter D and the axial length L of the injection orifice 17 and the specifications of the swirler 23 as a member to supply a swirling force to fuel are determined. At this time, the position of the fuel spray F with the long penetration length can be freely set by using the expression to obtain the penetration turning angle Pdeg.

That is, in a fuel cross section (A—A cross section in the embodiment), the fuel position with the long penetration length (flow amount concentrated portion) can be adjusted at an arbitrary angle within 360°. As a result, the position of the fuel spray F with the long penetration length can be set to the most efficient position in engine combustion without constraint of the status of attachment of the injector 10.

According to the present embodiment, the position of the fuel spray with the long penetration length can be freely set in a target direction by controlling the flow speed distribution of the spray. Further, as the number of turns (amount of swirling) until the fuel arrives at the outlet of the injection orifice can be set by adjusting the axial length L of the injection orifice 17, the fuel spray with the long penetration length can be directed to a predetermined arbitrary direction.

As the step portion 25 is formed in the outlet of the injection orifice 17, a part of spray in the portion with the long penetration length (hereinbelow, referred to as "lead spray") can be further increased.

The inventors found that the lead spray becomes strong and the penetration becomes longer by the setting of the step portion 25. However, they also found, as another characteristic, that the lead fuel spray disappears under high temperature and high pressure (e.g., atmospheric temperature is 160° C. and atmospheric pressure is 0.5 MPa). The condition under high temperature and high pressure is set on the assumption of fuel injection at an engine compression stroke.

Figure 4:
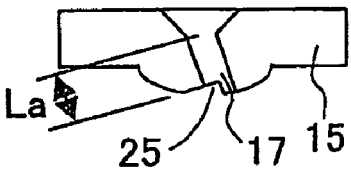
FIG. 4 is a table showing forms of fuel spray under normal temperature atmospheric pressure and high temperature high pressure due to a difference of nozzle structure.
Figure 4:
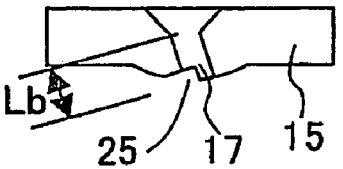
Figure 4:
Figure 4:
Figure 4:
Figure 4:

FIG. 4 shows an example of the above phenomenon. In FIG. 4, the fuel spray from the injector 10 with a nozzle plate having La where the axial length L of the injection orifice 17 is longer, is compared with fuel spray from the injector 10 with a nozzle plate having Lb where the axial length L is shorter. In the spray by injection with the axial length La, long penetration is observed under normal temperature/atmospheric pressure, and lead spray remains at high temperature/high pressure. On the other hand, in the spray by injection with the axial length Lb, a lead spray is short under normal temperature/atmospheric pressure, and the lead spray disappears under high temperature/high pressure.

The mechanism to cause this phenomenon is considered as follows. The step portion in the outlet of the injection orifice causes deflection in the flow amount distribution of spray fuel at the outlet of the injection orifice, and as a result, the pattern of the injected fuel spray has nonuniform distribution with a flow amount concentrated portion in its part.

In use of an injector 10 without deflection angle where the central axis of the injection orifice 17 is coaxial with that of the injector 10, it is assumed that the fuel given with a swirling force by the swirler 23 has uniform distribution while swirling in the injection orifice 17 and is injected from the outlet. In the case of uniform flow amount distribution, the position and the angle of the step portion 25 and the length of the injection orifice can be arbitrarily set (e.g., Japanese Patent Laid-Open No. 2000-329036).

On the other hand, in use of a deflected nozzle where the central axis E of the injection orifice 17 is slanted at the deflection angle $\beta$ in relation to the central axis C of the injector 10, the flow amount distribution has deflection in the injection orifice 17 as described above. In a case where a high density portion of the flow amount distribution overlaps with the influence of the step portion, the fuel becomes in a synergistical (superimposed) state by the positive over raps as shown in the left side (La: long) in FIG. 4. On the other hand, in a case where a low density portion of the flow amount distribution overlaps with the influence of the step portion, the fuel becomes in a set-off state by the negative over raps as shown in the right side (Lb: short) in FIG. 4.

Accordingly, the intensity of the lead spray can be freely controlled by combining the deflected nozzle technique and the stepped nozzle technique, such that the lead spray can be disappeared or left under high temperature high pressure. By application of this technique, a wide angle spray including the lead spray can be realized under normal temperature/atmospheric pressure and a narrow angle spray where the lead spray disappeared can be realized under high temperature/high pressure. Thus an injector 10 with variable spray angle can be provided.

Upon application of the injector 10 to the engine, as a primary product, the axial length of the injection orifice 17 is set to an axial length including an adjustment margin (L+Lc). As an example, the shape of the end portion of the injection orifice as the primary product has a semispherical shape with a spherical diameter (L+Lc) as indicated with a virtual line in FIG. 2.

The secondary product (final product) of the nozzle plate, in which the axial length of the injection orifice 17, the shape of the step portion 25 and the direction of the step portion 25 in relation to the deflection direction of the injection orifice 17 are adjusted, are obtained by cutting the end surface (semispherical portion) of the injection orifice 17 as the primary product. Thus the application of the injector 10 to the engine can be simply made with versatility and diversity.

Figure 5A:
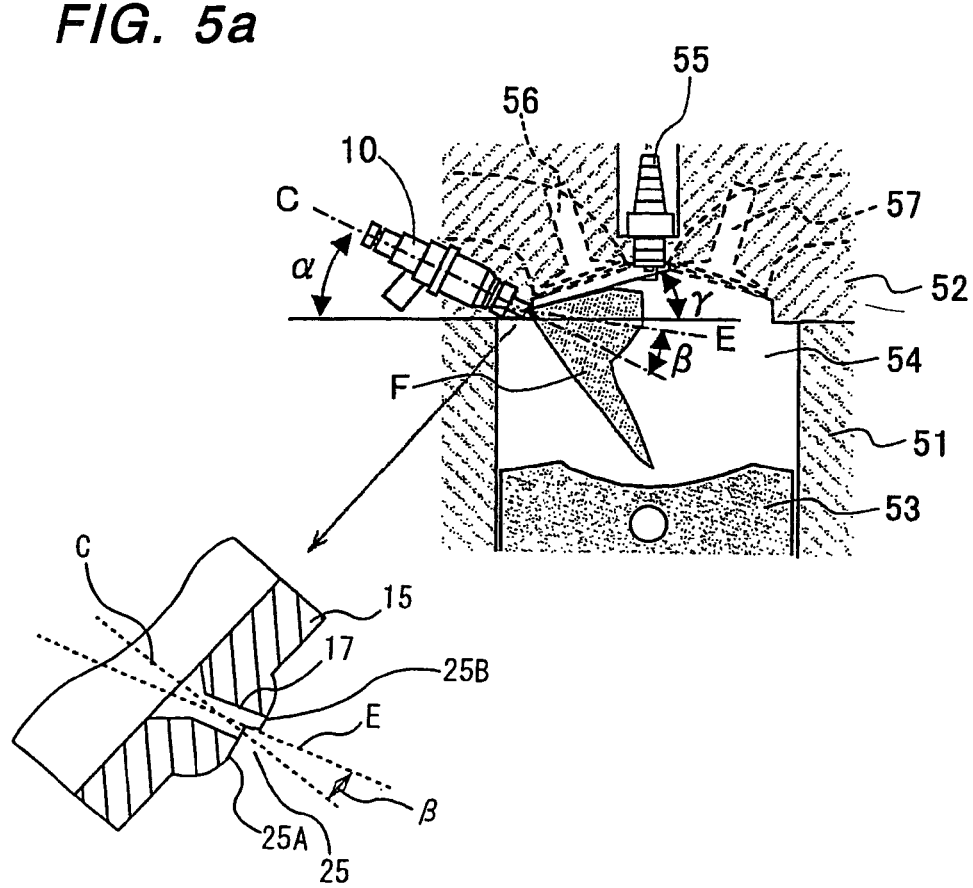
FIGS. 5A and 5B are cross-sectional views showing spray statuses in a direct-fuel injection type engine with the fuel injection valve according to the embodiment.
Figure 5B:
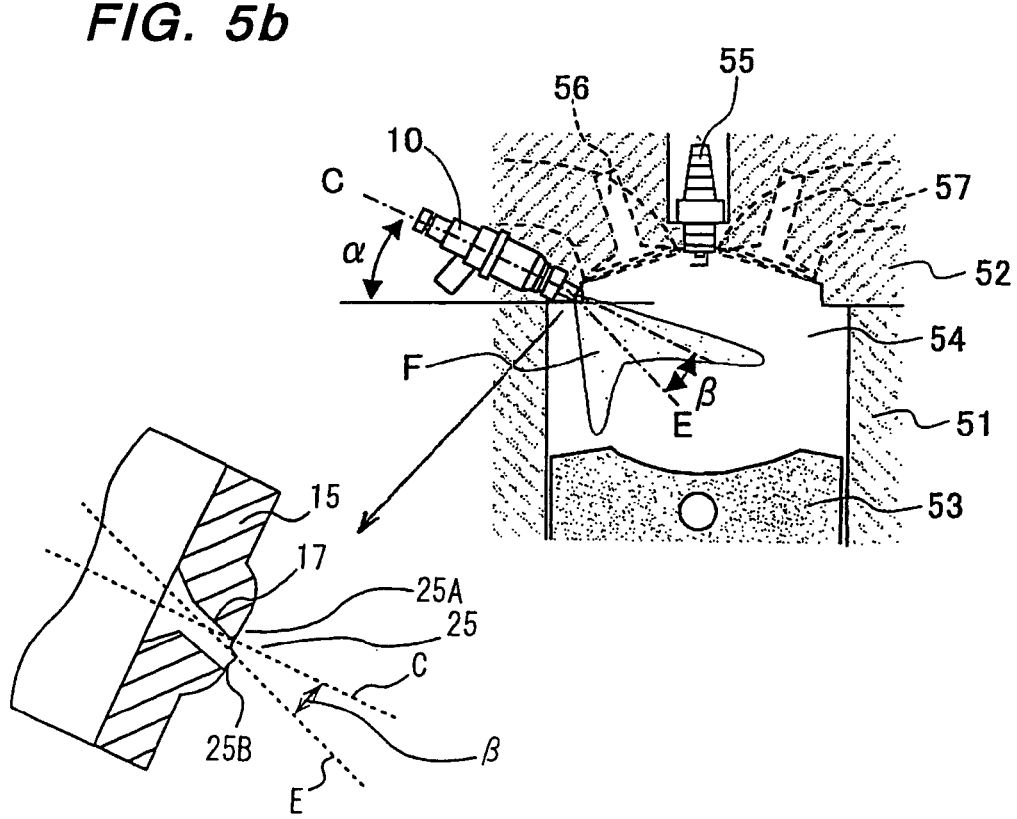

FIGS. 5A and 5B show a direct-fuel type injection engine (gasoline engine) to which the injector 10 having the above structure is applied. In FIGS. 5A and 5B, reference numeral 51 denotes a cylinder block; 52 is a cylinder head; 53 is a piston; 54 is a combustion chamber (cylinder); 55 is an ignition plug; 56 is an intake valve; and 57 is an exhaust valve.

In the direct-fuel injection type engine in FIGS. 5A and 5B, the attachment angle α of the injector 10 (an angle from a horizontal line to the axis C of the injector) is small (about 20°). As injection of fuel into the combustion chamber 54, the fuel is injected in the direction where the axis E of the injection orifice is deflected at the angle β from the axis C of the injector 10.

In the direct-fuel injection type engine in FIG. 5A, the nozzle deflection direction is on the ignition plug side, whereas in the direct-fuel injection type engine in FIG. 5B, the nozzle deflection direction is on the piston upper-surface side. Assuming that an angle formed with one line (which is a line between a nozzle end position and an end gap position of ignition plug 55) and another line (which is the horizontal line) is γ, the nozzle deflection direction is set within the range of the angle γ from the axis C of the injector 10. That is, the deflection angle β can be set within the range where $0<\beta<(\alpha+\gamma)$ holds.

In the example of FIG. 5A, the deflection direction of the injection orifice 17 is directed to the ignition plug 55 side on the basis of the central axis C of the injector 10, and the lower face 25A of the step portion 25 (the face where the length of the axial direction of the injection orifice is shorter) is directed to the piston 53 side. On the other hand, in the example of FIG. 5B, the deflection direction of the injection orifice 17 is directed to the piston 53 upper surface side, and the higher face 25B of the step portion 25 is directed to the ignition plug 55 side.

In the structure of FIG. 5A, as fuel spray injected under atmospheric pressure, the fuel spray F is deflected to the ignition plug 55 side by approximately β, while the lead spray with maximum penetration (fuel spray travel) of the fuel spray advances toward the upper surface of the piston 53.

On the other hand, in the structure of FIG. 5B, the fuel spray F is deflected to the piston 53 upper surface side by approximately β. Accordingly, the lead spray of the fuel spray F is downward from the horizontal line E while it advances to a position away from the ignition plug 55. The entire fuel spray F has a wide angle approximately covering the entire piston 53.

Figure 6A:
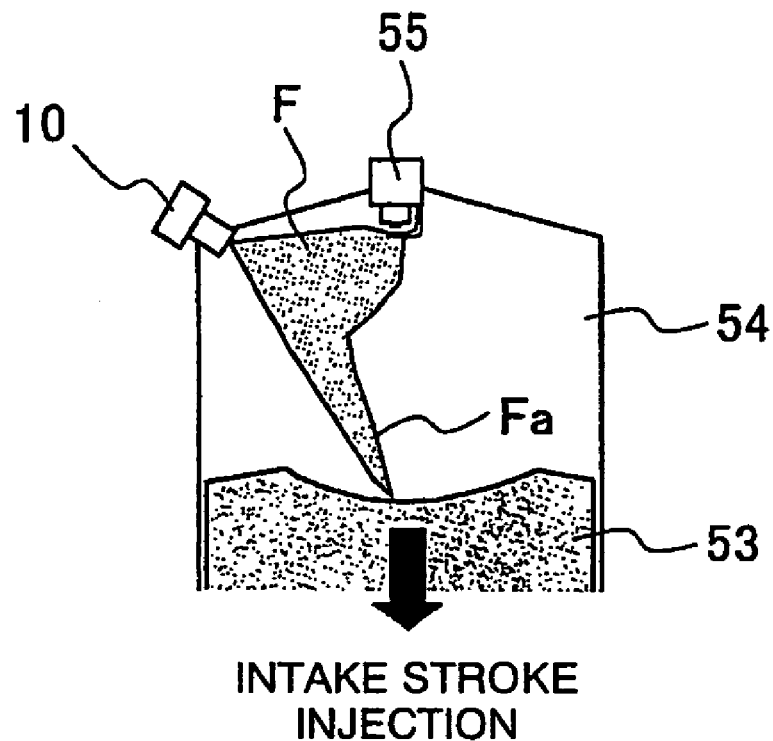
FIGS. 6A and 6B are cross-sectional views showing spray patterns in a combustion chamber of the fuel injection valve according to the embodiment.
Figure 6B:
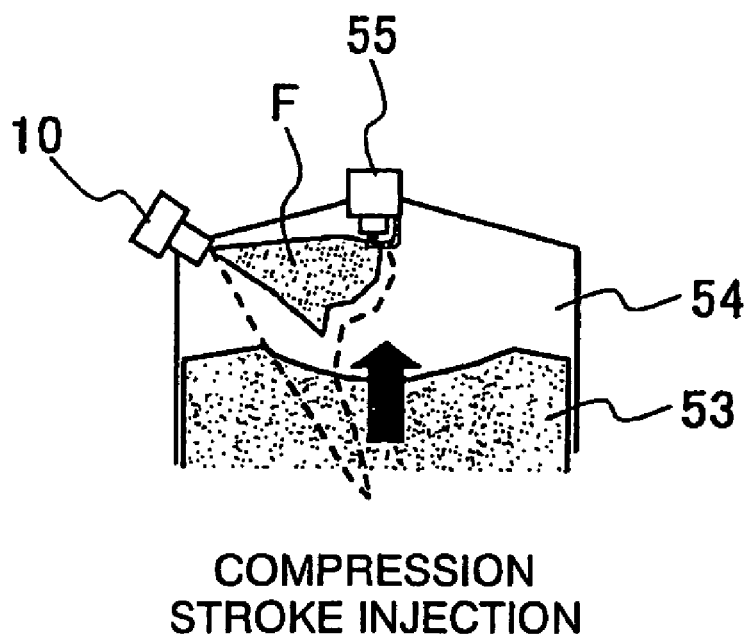

The behavior of spray in the engine combustion chamber in each driving state of the direct-fuel injection type engine in FIG. 5A will be described with reference to FIGS. 6A and 6B. When the fuel is injected upon intake stroke based on a control signal from an engine control unit (not shown), it is necessary to form uniform air-fuel mixture where the fuel is sufficiently mixed with air. In the injector 10 in this case, the fuel spray F is injected in the direction of the piston 53 at a wide spray angle including lead fuel spray Fa as shown in FIG. 6A. Accordingly, the formation of uniform air-fuel mixture, i.e., homogeneous combustion can be excellently attained.

Figure 7:
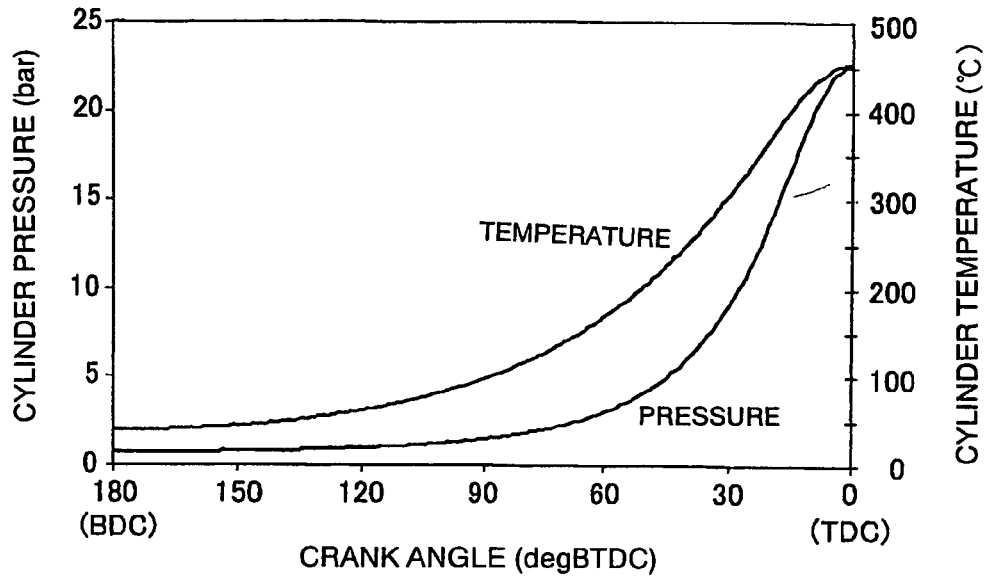
FIG. 7 is a graph showing variations in pressure and temperature in the combustion chamber of the engine.

On the other hand, when the fuel is injected upon compression stroke, it is necessary to form stratified air-fuel mixture where the air-fuel mixture is concentrated around the ignition plug 55. As shown in FIG. 7, the temperature and pressure in the combustion chamber in the compression stroke are increased in correspondence with increase of pressure of the piston 53. For example, at 30° before the top dead center (TDC), the temperature is about 300° C. and the pressure is about 8 bar. Accordingly, in a case where the fuel is injected under such high temperature/high pressure, the lead fuel spray Fa in the direction of the piston 53 disappears as described with reference to FIG. 4, and the fuel spray shape becomes as shown in FIG. 6B.

The axis E of the injection orifice 17 is slanted in nonparallel to the central axis C of the injector. As the fuel is injected in the direction of the plug 55, the main spray including a high density portion of the flow amount distribution is injected in the plug direction and is stratified around the plug. At this time, it is preferable that air flow assistance such as tumble or swirl can be added.

Conventionally, if the amount of accelerator depression is large and the engine control unit (not shown) determines that a required torque is large, it outputs a control signal to increase the amount of injection. However, the amount of fuel adhered to the piston increases and which causes smoke. In the present embodiment, in a case where the amount of injection has increased, as the amount of injection in the direction of the axis of the injection orifice 17 increases, the adhesion of fuel to the piston can be reduced and emission of smoke can be reduced.

As another merit, as the speed of main spray injected in the plug direction is lower than that of the lead spray, spread of the spray can be prevented and stratification (concentration around the ignition plug) can be improved. As a result, the amount of EGR can be increased, and the ratio of fuel consumption and the amount of NOx emission can be reduced.

Figure 8:
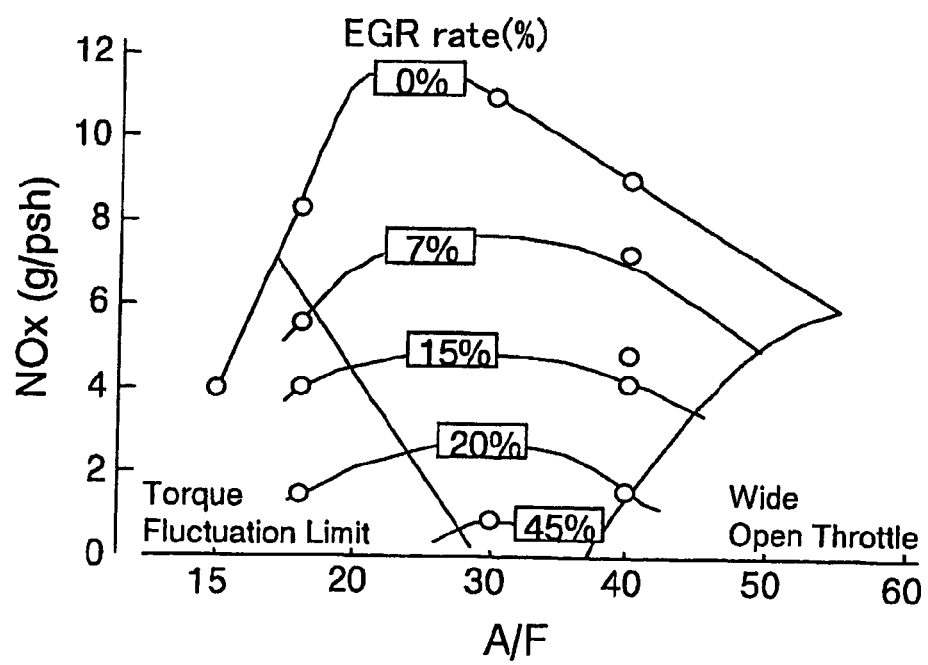
FIG. 8 is a graph showing the experimental result of EGR ratio and NOx emission amount.

FIG. 8 shows the result. If a large amount of EGR is introduced, as combustion becomes unstable, the limit of EGR ratio is conventionally about 20%. The EGR gas dilutes the air-fuel mixture, thereby the stratification is degraded. The experimental injector 10 of the embodiment was manufactured and its performance was confirmed. As a result, the EGR was introduced up to 45% and the amount of Nox emission was reduced.

Further, in the injection style as shown in FIG. 6A, as the lead fuel spray Fa is injected in the direction of the piston 53, it is cared that the increase in the amount of HC emission occurs. Especially, immediately after engine start, as the temperature of catalytic agent is low and sufficient purifying performance cannot be obtained, it is necessary to reduce the amount of HC emitted from the engine.

Figure 9:
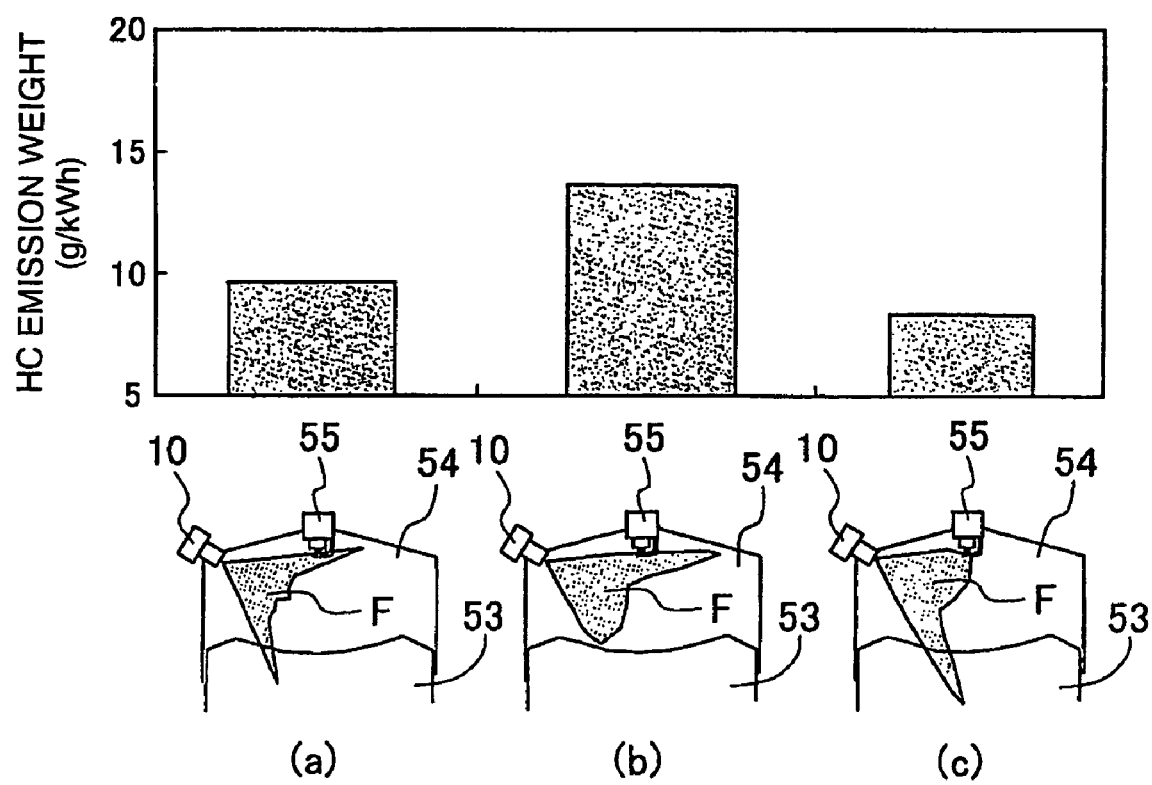
FIG. 9 is a graph showing the experimental result of spray pattern and HC emission amount.

The inventors checked the performance from the viewpoint, and obtained results as shown in FIGS. 9A to 9C. The driving was performed on the following driving condition, simulating an idle state immediately after starting, that the number of engine revolutions was 1400 rpm, a shaft torque was 20 Nm, an air-fuel ratio was 14.7, water temperature=oil temperature=30° C. held, and the engine was 1.8 L4-cylinder engine.

FIGS. 9A to 9C show images of spray patterns in the combustion chamber. It is understood from the results that the size of spray in the direction of the piston does not relate to the HC emission.

Figure 10A:
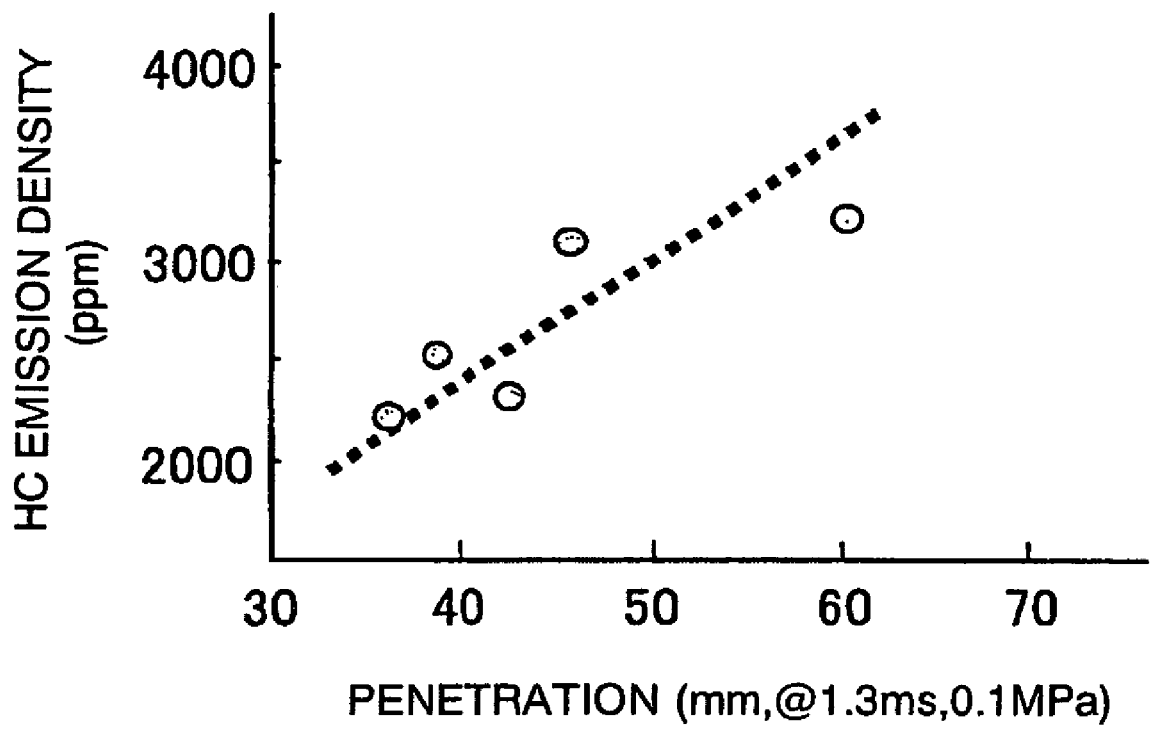
FIG. 10 is a graph showing the experimental result of penetration in a direction of the combustion chamber and HC emission density.
Figure 10B:
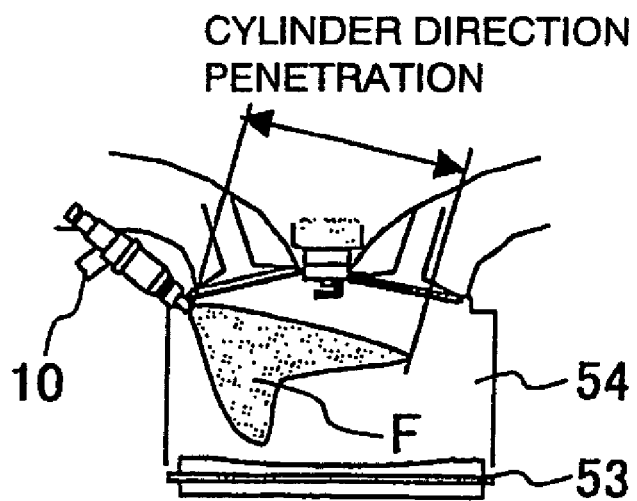

FIG. 10 shows the result from the viewpoint of penetration in the direction of the combustion chamber. As the penetration in the direction of the combustion chamber, the length of spray was measured from a photograph of spray after 1.3 sec from the start of fuel injection with fuel pressure of 7 MPa, by the amount of injection of 12.6 mcc, under atmospheric pressure. It is considered from this result that a main cause of HC emission is fuel component adhered around a combustion chamber wall opposite to the position of injection from the injector. It is understood that the structure of the present embodiment (the structure shown in FIG. 5A) effectively reduces the amount of HC emission immediately after starting.

On the other hand, in the direct-fuel injection type engine having the structure as shown in FIG. 5B, the fuel spray F injected upon intake stroke, at a wide spray angle including the lead fuel spray, is injected in the direction of the piston 53. Accordingly, the formation of uniform air-fuel mixture, i.e., homogeneous combustion can be excellently attained.

Further, the lead spray Fa in the fuel spray F injected upon compression stroke is directed to the ignition plug 55 side by the pressure of the piston. The intensity of the lead spray can be controlled by combination of the injection orifice deflection technique and the technique of formation of step portion at the exit of injection orifice. The lead spray can be disapeared or left under high temperature/high pressure in the engine combustion chamber. Further, the lead spray can be caused to arrive around the ignition plug by arbitrary control. Accordingly, excellent stratified combustion drive can be attained.

As described above, by application of the technique as shown in FIGS. 5A and 5B, a wide fuel spray angle can be realized under normal temperature/atmospheric pressure and a narrow fuel spray angle can be realized under high temperature/high pressure. Thus an injector of variable spray angle type can be provided.

The embodiment of the present invention has been described as above, however, the present invention is not limited to the embodiment. Various modifications can be made in designing without departing from the spirit of the present invention described in the scope of the claims.

For example, in the above-described embodiment, the axial length L of the injection orifice 17 of the injector 10 is arbitrarily set by cutting process of the end surface of the injection orifice, however, the process is not limited to cutting, but other process such as pressing may be used.

Further, the technical idea of the present invention includes that, even if the step portion is replaced with a partial notch, increment in penetration similar to that in the above embodiment can be attained.

As it is understood from the above description, according to the fuel injection valve of the present embodiment, as the central axis of the injection orifice is slanted at a predetermined deflection angle to the central axis of the valve body, deflected injection is performed in correspondence with the deflection angle. The spray penetration concentrated area can be set in an arbitrary position around the central axis of the injection orifice by setting of the axial length of the injection orifice as well as swirling injection. Further, the spray shape and spray distribution can be adjusted by the step portion in the outlet of the injection orifice, and by the combination of these settings, operations depending on the respective settings work synergistically or cancel out each other. And various settings of the fuel spray direction, the spray shape, the penetration length, the existence/absence of lead spray and the like can be made. That is, the fuel injection valve according to the present invention has high freedom to set these elements to optimum states corresponding to each type of engine, and has excellent versatility.

Further, according to the direct-fuel injection type engine of the present embodiment, a fuel injection valve, in which the axial length of the injection orifice, the shape and direction of the step portion of the outlet of the injection orifice are adjusted in correspondence with the engine, can be provided. And the direction of fuel spray, the shape of spray, the penetration length, the existence/absence of lead spray and the like are set in correspondence with the combustion type, the shape of combustion chamber, relative positional relation between the ignition plug and the fuel injection valve and the like. Thus the combustion performance, the fuel economical efficiency and the exhaust gas performance can be improved.

Further, according to the method of manufacturing a fuel injection valve of the present embodiment, the axial length of the injection orifice, the shape of step portion of the outlet of the injection orifice and the direction of the step portion are individually set by cutting or pressing of the end surface of the injection orifice as a primary product. Then the respective elements of the direction of fuel spray, the shape of spray, the penetration length, the existence/absence of lead spray and the like, can be individually optimized upon manufacture of secondary product in correspondence with the type of engine.

Figure 11:
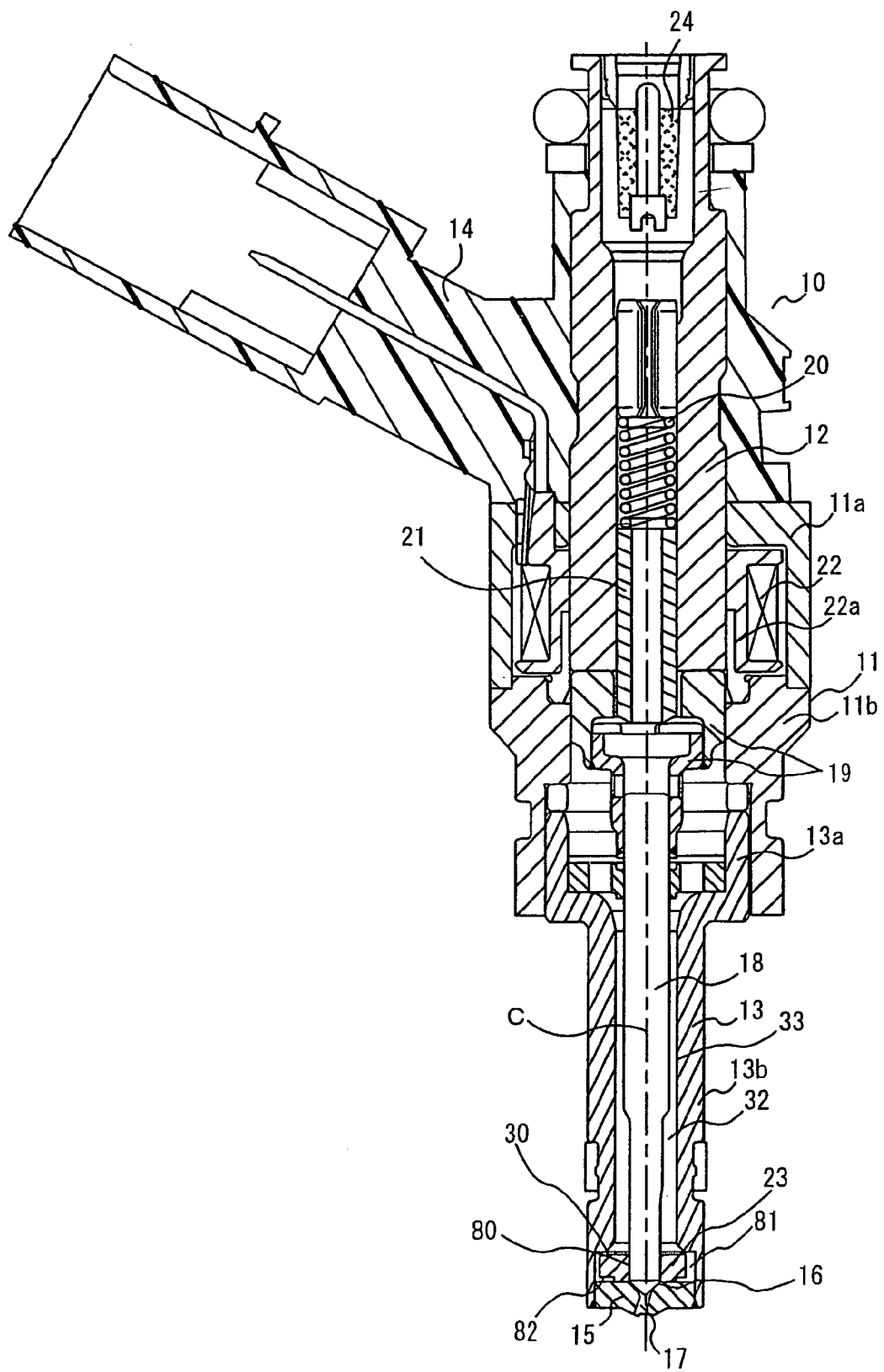
FIG. 11 is a longitudinal cross sectional view of the fuel injection valve according to another embodiment of the present invention.
Figure 12:
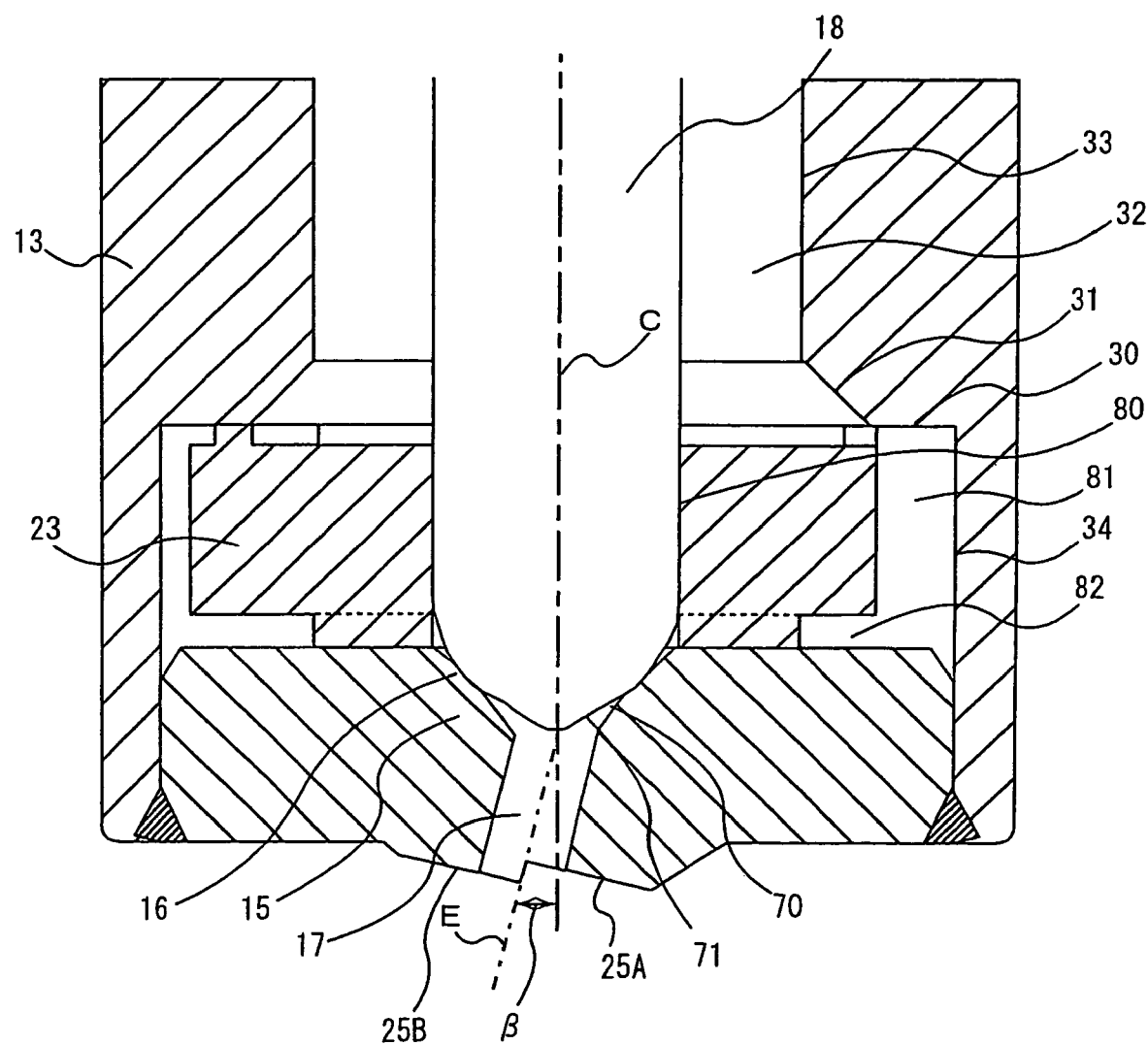
FIG. 12 is an enlarged cross-sectional view of a principal part in FIG. 11.

Next, a further particular structure of the above embodiment will be supplementarily described as an embodiment shown in FIG. 11 and the subsequent figures.

As shown in FIG. 11, the electromagnetic coil 22 of the injector 10 is provided on a lower periphery of the center core 12 via a bobbin 22*a*, and is covered with a yoke as the main body case 11. In this example, the yoke 11 is divided into an upper side yoke 11*a* and a lower side yoke 11*b*, and these yokes are combined by welding to one yoke 11.

The yoke 11 and the nozzle body 13 are connected with each other by, e.g., plastic flow.

The nozzle body 13 has an upper end cylindrical member 13*a* with a large diameter and a remaining major (approximately ¾ or greater) part of cylindrical member 13*b* with a small diameter. The thin cylindrical member 13*b* is projected from a lower end of the yoke 11*b*. The injector of this type, which is a so-called long nozzle type injector, has a shape appropriate to a direct-fuel injection type engine. The upper end cylindrical member 13*a* of the nozzle body 13 is inserted in the yoke 11*b* and connected to the yoke 11*b* by metal flow or the like.

The nozzle plate 15 provided with the injection orifice 17 and the valve seat 16 is fixed by welding to an end inner periphery of the nozzle body 13. Further, the swirler 23 is provided. FIG. 2 is an enlarged view showing the status of attachment of the nozzle plate and the swirler.

The swirler 23 is provided with a guide hole 80 to guide the reciprocating motion of the valve element 18 at its center. A fuel channel 81 is provided between the outer periphery of the swirler 23 and the inner periphery of the nozzle body 13. Further, plural fuel channels 82 from the fuel channel 81 on the outer periphery of the swirler 23 to the guide hole 80 are provided in the bottom surface of the swirler 23. The fuel channels 82 serve as downstream passages of the fuel channel 81. As the fuel channels 82 are eccentric to the center of the guide hole 80, fuel flowing from the fuel channels 82 to the guide hole 80 is supplied with a swirling force.

The nozzle plate 15 and the swirler 23, overlapped with each other, are inserted in the end inner periphery of the nozzle body 13. The edge of upper surface of the swirler 23 is in contact with a step portion 30 provided in the inner periphery of the nozzle body 13, thus the swirler 23, held between the step portion 30 and the nozzle plate 15, is thereby fixed.

The interval between an inner periphery 33 of the nozzle body 13 upstream of the swirler 23 and the outer periphery of the valve element 18 is used as a fuel channel 32. The diameter of the inner periphery 33 of the nozzle body 13 is smaller than an inner periphery 34 of the nozzle body 13 in which the swirler 23 and the nozzle plate 15 are inserted. A taper 31 is formed between the inner periphery 33 and the step portion 30. The flow of fuel from the fuel channel 32 to the fuel channel 81 is smoothly guided with the taper 31.

The outer periphery of the valve 18 has an arcuate curved surface 70 in contact with the tapered valve seat 16, and has a pointed conical surface 71. When the valve element 18 is moved away from the valve seat 16 (upon valve opening), the conical surface 71 smoothly guides the swirling fuel to the orifice 17 in cooperation with the valve seat 16 without reduction of the swirling force. Note that the valve element 18 may be a ball valve on the tip of a rod.

The injector 10 is supplied with pressurized fuel from the fuel pump (not shown). When the electromagnetic coil 22 is energized, a magnetic flux occurs, and the center core 12, the yoke 11 and the plunger 19 form a closed magnetic circuit. The plunger 19 is magnetically attracted to the center core 12, the valve element 18 is moved away from the valve seat 16, thus the valve is opened and the swirling fuel is injected from the injection orifice 17. The injected fuel spray F is formed in a conical shape.

Next, the structure of the injection orifice 17 will be supplementarily described.

In a case where the axis E of the injection orifice 17 is deflected to the central axis C of the injector 10, a flow of fuel where the amount of flow is locally concentrated exists in the flow of fuel swirling and passing through the injection orifice 17. The flow amount concentrated portion is set in a desired direction at the exit of the injection orifice 17 by arbitrarily determining the length of the injection orifice 17 in correspondence with the course of the flow amount concentrated portion. Further, a part of the edge of the injection orifice 17 is cut as indicated with numeral 25A. The cut 25A is positioned in the flow amount concentrated portion in the exit of the injection orifice as one surface of the step portion. The surface 25A is a lower surface of the step portion.

As described above, when the swirling fuel is injected from the injection orifice 17 having the deflection angle, the injected fuel spray has an inclination, and spray with long penetration where spray is locally concentrated occurs in some direction. Since the mechanism of spray concentration was not sufficiently analyzed, how to arbitrarily control the directivity of the spray concentrated portion was not known.

(1) Next, the mechanism of occurrence of the above-described flow amount concentrated portion (the flow amount concentrated portion becomes an injected fuel spray concentrated portion) in fuel injection orifice will be described.

Figure 13:
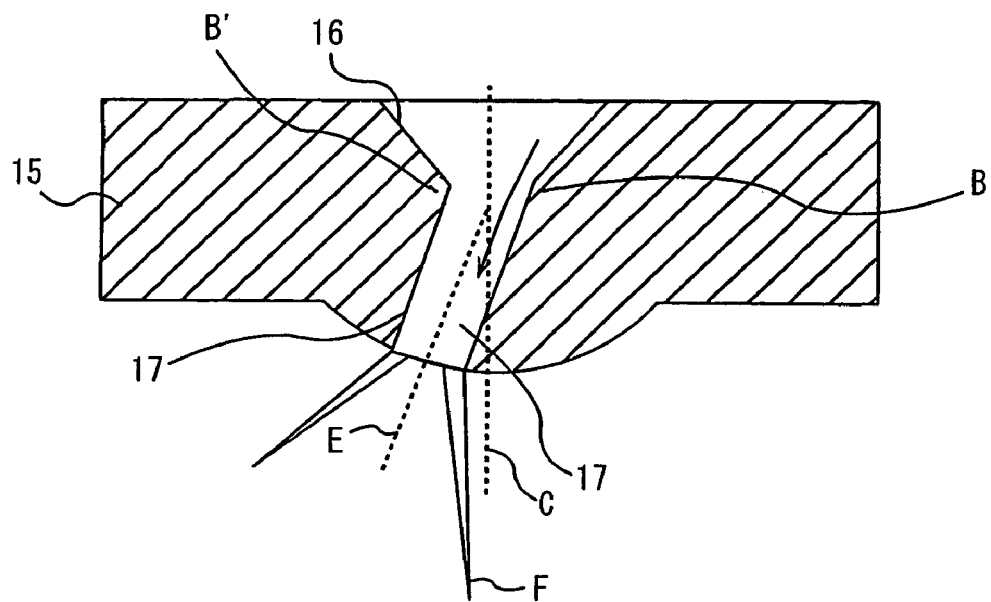
FIG. 13 is an explanatory diagram showing a mechanism of fuel concentration which occurs in a fuel injection orifice deflected to the axis of the injection valve.
Figure 14:
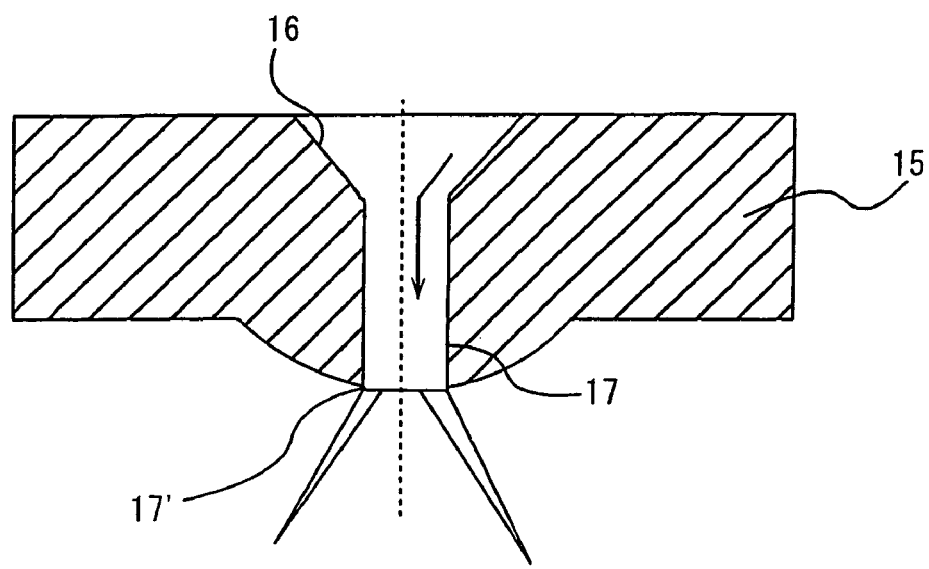
FIG. 14 is an explanatory diagram showing a fuel injection behavior in a case where the axis of the injection valve and the fuel injection orifice are parallel to each other.

FIG. 13 shows the mechanism of occurrence of flow of swirling fuel flowing through the deflected orifice (injection orifice) 17. FIG. 14 shows a model of swirling fuel flowing through a non-deflected orifice 17' where the axis E of the injector 10 and the central line C of the injection orifice 17' coincide with each other.

In the case of the non-deflected orifice 17', as the tapered member (valve seat) 16 of the nozzle plate and the orifice 17' are bilaterally symmetrical, the flow of fuel entering the tapered member 16 uniformly flows to the orifice 17', and the spray becomes uniform.

On the other hand, in the case of the deflected orifice 17 in FIG. 13, the tapered member 16 and the orifice 17 are bilaterally asymmetrical as indicated with alphabets B, B' (the alphabet B indicates the shape on the non-deflected side, and the alphabet B', that on the deflected side). In this case, the flow entering the tapered member has a turbulent flow with a wall B' on the deflected side upon entrance into the orifice 17, and a locally fast flow occurs in a position corresponding to the wall B'. Further, a fuel concentrated portion occurs in the fast flow area. The fuel concentrated portion flows, with the locally fast flow, while swirling, to the exit of the orifice. It is considered that the above phenomenon causes a nonuniform flow-speed distribution where a high axial-direction flow speed and a low axial-direction flow speed are mixed in the axial-direction flow speed of the fuel spray. Further, as the fuel is always swirled rightward, the high axial-direction flow speed portion and the low axial-direction flow speed portion also flow through the injection orifice 17, while swirling rightward, to the exit of the injection orifice.

Figure 15:
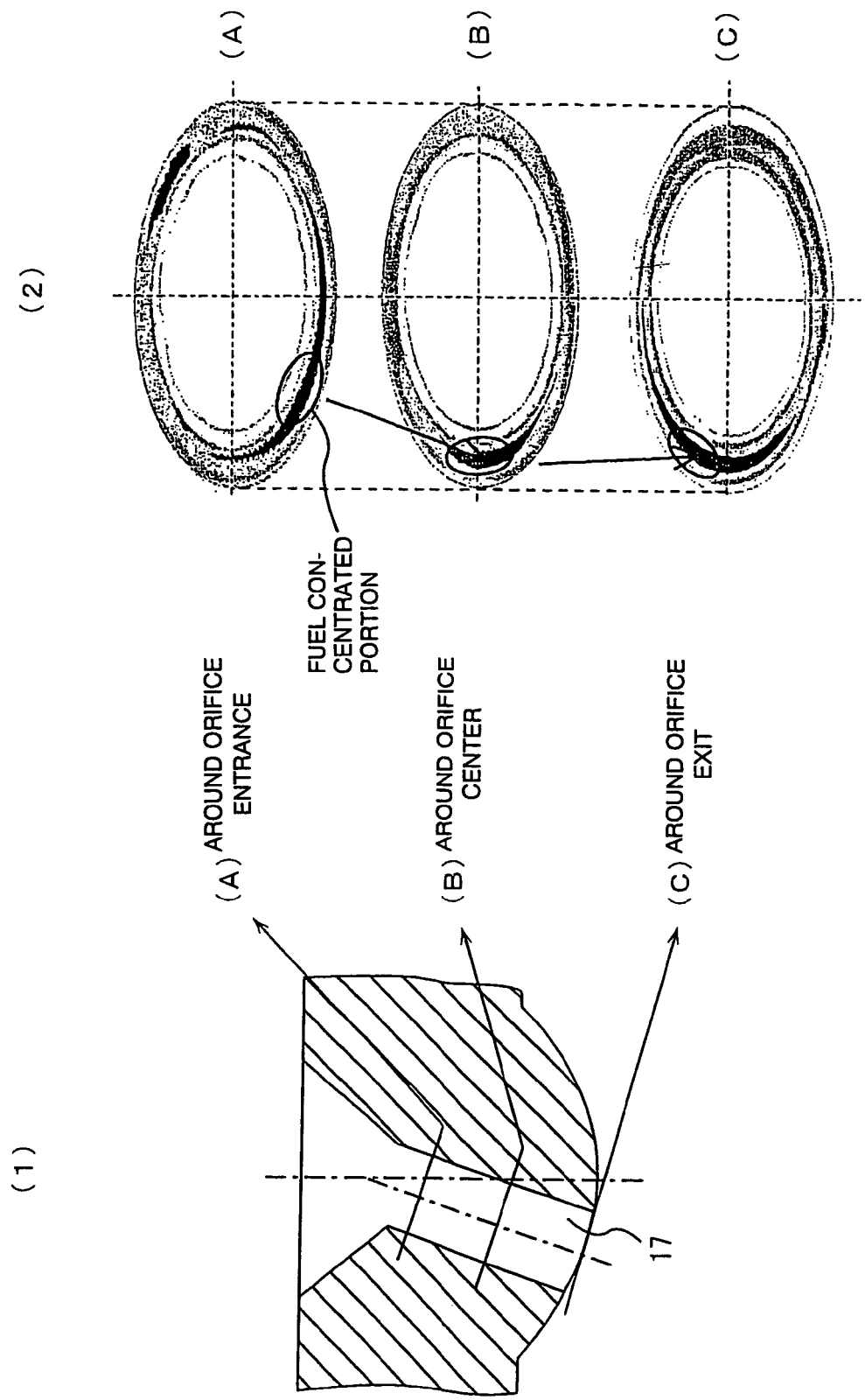
FIGS. 15(1) and 15(2) are explanatory diagrams showing a swirl fuel flowing through the fuel injection orifice.

FIGS. 15(1) and 15(2) show course of fuel concentrated portion in the injection orifice 17. In FIG. 15(2), (A) to (C) are cross sections around the entrance, the center and the exit of the injection orifice 17 in FIG. 15(1). As it is apparent from the figure, the fuel concentrated portion moves in the injection orifice 17, while swirling, to the exit.

The inventors focused attention on the mechanism of occurrence of fuel concentration, and found that if the fuel concentrated portion at the exit of the injection orifice and the step portion (notch) in the edge of the exit are brought into correspondence, the penetration of lead spray is further increased by synergic work of the both operations.

It is known that if the step portion (L-shaped step) 25 in the axial direction is formed in the exit of the injection orifice 17, fuel injected from the lower step surface (orifice exit with shorter axial length) 25A is easily concentrated in comparison with fuel injected from a higher step surface (orifice exit with longer axial length) 25B. If the orifice step and the fuel concentration at the exit of the orifice do not correspond with each other, the elements of spray concentration are dispersed and the penetration of lead spray cannot be increased. On the other hand, if the orifice step and the fuel concentration correspond with each other, the penetration of lead spray can be extremely effectively increased.

Figure 16:
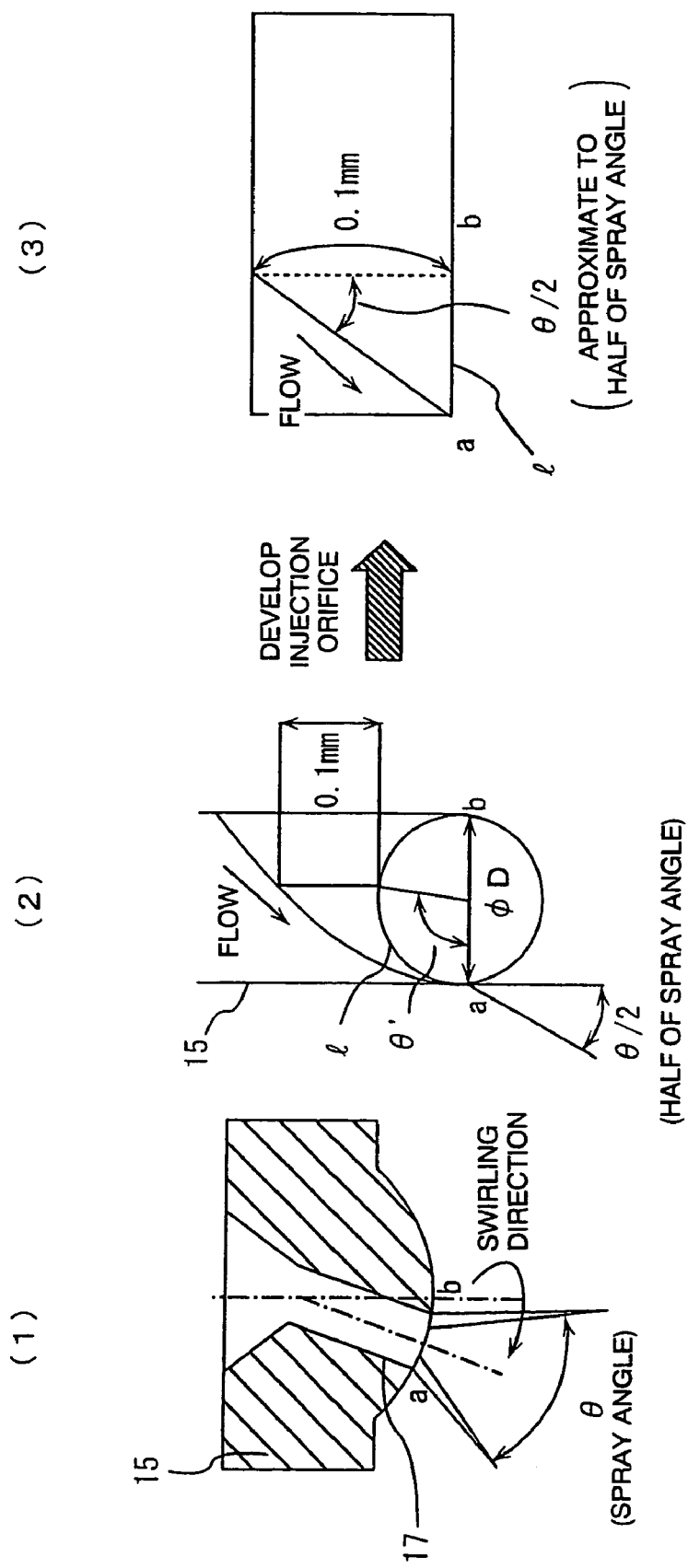
FIGS. 16(1) to 16(3) are explanatory diagrams showing a model of turning angle θ' of fuel concentrated portion flowing through the fuel injection orifice (deflected orifice) per about a 0.1 mm orifice length.

FIGS. 16(1) to 16(3) show a model of turning angle θ' per orifice length of 0.1 mm in the fuel concentrated portion flowing through the injection orifice (deflected orifice) 17. The angle formed with the central axis of an orifice 101 and the flow direction of the fuel concentrated portion is approximated to the half of a main spray angle θ (θ/2). Assuming that the distance of the orifice exit in a circumferential direction per orifice length of 0.1 mm is 1, and an orifice diameter is ϕD, the approximation of the turning angle θ' is represented as follows.

$$\theta' = 360 \times \tan(\theta/2)/\pi/\phi D \qquad (2)$$

Figure 17:
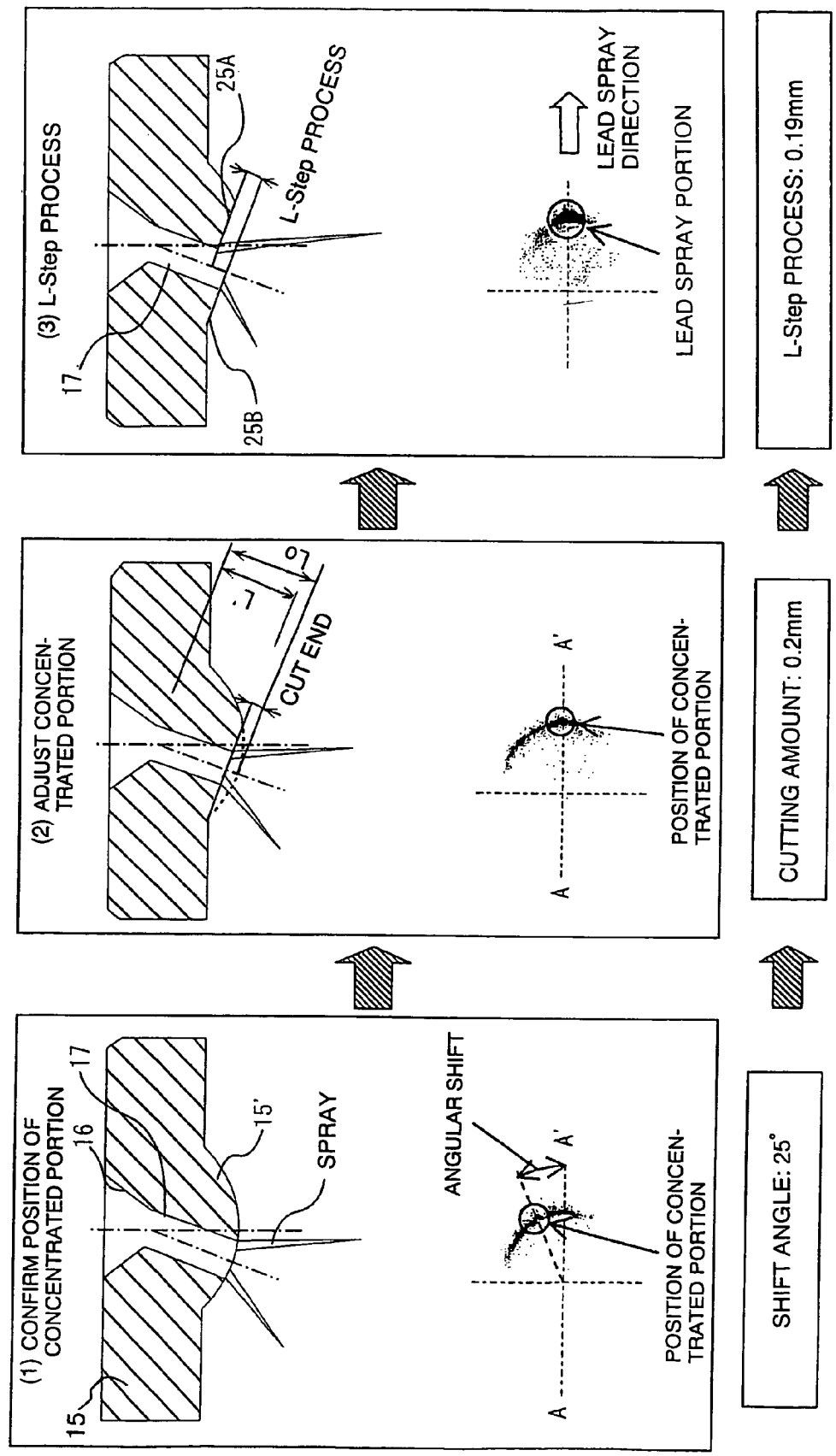
FIGS. 17(1) to 17(3) are explanatory diagrams showing a procedure of process of the exit of the injection orifice and a change in penetration of lead spray according the embodiment.

FIGS. 17(1) to 17(3) show a procedure of process of the injection orifice and variations in penetration of lead spray according the present embodiment.

In FIG. 17(1), the valve seat 16 and the deflected orifice 17 are press-processed in the nozzle plate 15. Further, a projection 15' is formed on the lower surface of the nozzle plate 15. The fuel concentrated portion at the exit of the orifice (injection orifice) 17 is finally formed in a counter-deflection direction of the orifice. In FIG. 17(1), first, the position of the fuel concentrated portion is checked. At the stage of FIG. 17(1), an orifice length Lo is calculated with the above-described logical expression (for example, 1.7 mm), however, a shift angle to a target position of the fuel concentrated portion is 25°. In FIG. 17(2), to correct the shift angle, the projection 15' is cut at about its end, thus the position of the fuel concentrated portion is adjusted. In this case, the orifice length Lo is cut by a cutting amount tc (tc=Lo−L') vertically to the axis of the orifice 17, thereby the channel length of the orifice 17 can be adjusted. By this adjustment, the position of the fuel spray concentrated portion can be moved onto a line A–A' in the target direction. "L" corresponds to a distance from the higher surface 25A of the step portion 25 to the entrance of the injection orifice.

The relation between the cutting amount tc and an turning angle Pdeg of fuel concentrated portion is obtained with the following expression (1).

$$Pdeg = ((tc \times tan(\theta/2))/(\pi \times D)) \times 360) \quad (1)$$

In the above expression, "tc" is the amount of cutting of the orifice 17; θ, a main spray angle of the spray F;, the ratio of the circumference of a circle to its diameter; and D, the diameter of the orifice 17.

The cutting amount is, for example, 0.2 mm. The cut surface is vertical to the deflected orifice.

Next, as shown in FIG. 17(3), by deleting the half of the orifice exit surface on the counter-deflection side (corresponding to a partial cutting of the edge of the exit of the injection orifice), the cross-section of the orifice exit has an L-shaped step portion (in this example, a step of 0.19 mm). In this manner, an orifice where the final orifice length is 1.5 mm and the step is 0.19 mm is formed. The fuel concentrated portion and the lower step surface 25A correspond with each other.

That is, the edge 15' of the exit of the injection orifice 17 has the two slopes 25A and 25B inclined to the central axis C of the injection valve, and these slopes form a step portion in the exit surface of the injection orifice. That is, the notch provided in a part of the edge of the exit of the injection orifice is formed by utilizing the step portion. The two slopes are formed by cutting process or press working, however, the formation of the slopes is not limited to these processes.

(2) Next, in the present embodiment, the influence on the width of fuel concentrated portion by the deflection angle of the injection orifice 17, the eccentric amount of the L step, the angle of the valve seat and the step of the L-step was determined.

Figure 18:
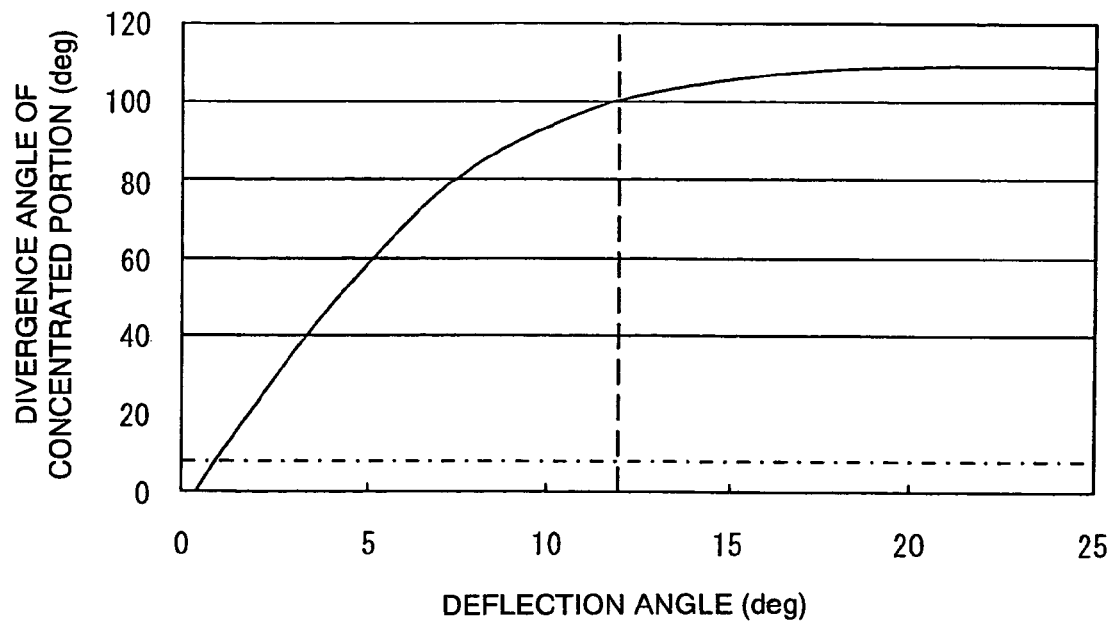
FIG. 18 is a graph showing the relation between an orifice deflection angle and a divergence angle of the fuel concentrated portion at the exit of the an orifice.

FIG. 18 shows the relation between the deflection angle of the orifice and a divergence angle of the fuel concentrated portion at exit of the orifice. The divergence angle of the fuel concentrated portion becomes wider as the deflection angle increases. However, if the deflection angle is equal to or greater than a predetermined angle, the fuel concentrated portion does not change so much. According to the result of experiment, it can be presumed that no fuel concentrated portion exists when the deflection angle is 0°. Then the divergence angle of the fuel concentrated portion is about 100° when the deflection angle is 12°. The divergence angle almost does not change when the deflection angle is greater than 12°. Accordingly, it was found that the width (divergence angle) of fuel concentrated portion can be controlled by changing the deflection angle.

Figure 19:
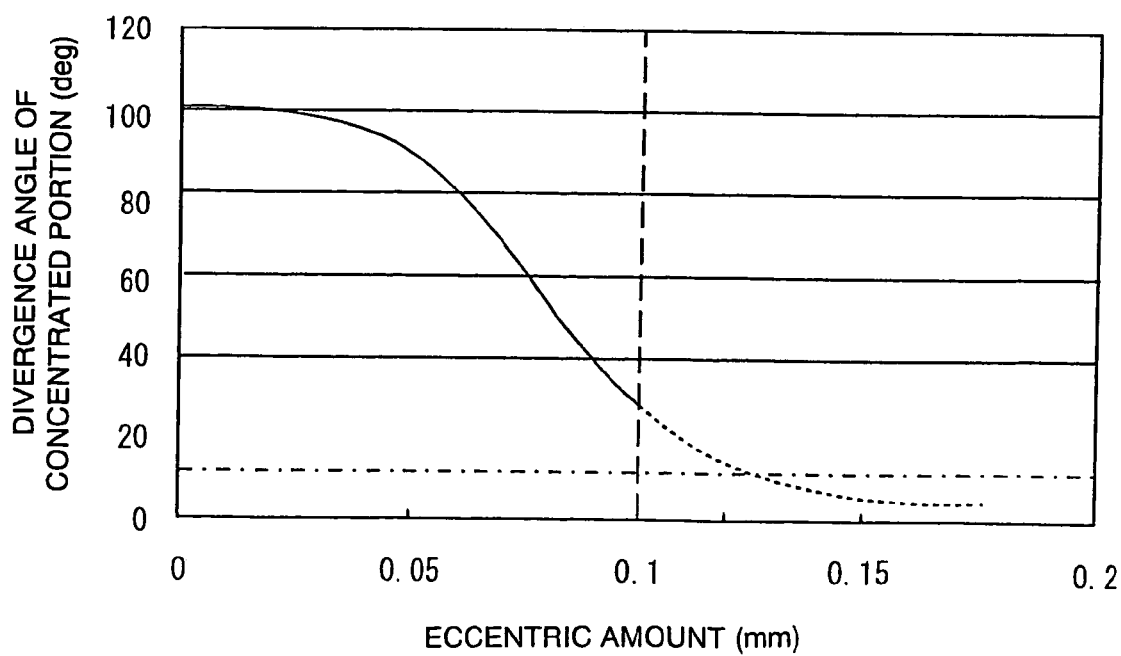
FIG. 19 is a graph showing the relation between a shift (eccentric amount) of the center of a valve seat to the center of injection orifice and the width (divergence angle) of the fuel concentrated portion.

FIG. 19 shows the relation between the width (divergence angle) of the fuel concentrated portion and a shift (eccentric amount) of the center of the valve seat to the center of the injection orifice 17. The eccentricity is in a direction at right angle to the deflection direction of the orifice. In FIG. 19, the eccentric amount is 0 mm, 0.05 mm and 0.1 mm. It is understood that the divergence angle of the fuel concentrated portion becomes narrower as the eccentric amount increases. Accordingly, the width of the fuel concentrated portion can also be controlled with the eccentric amount. An arbitrary fuel concentrated portion can be obtained by arbitrarily combining the eccentric amount and the deflection angle of the orifice.

Figure 20:
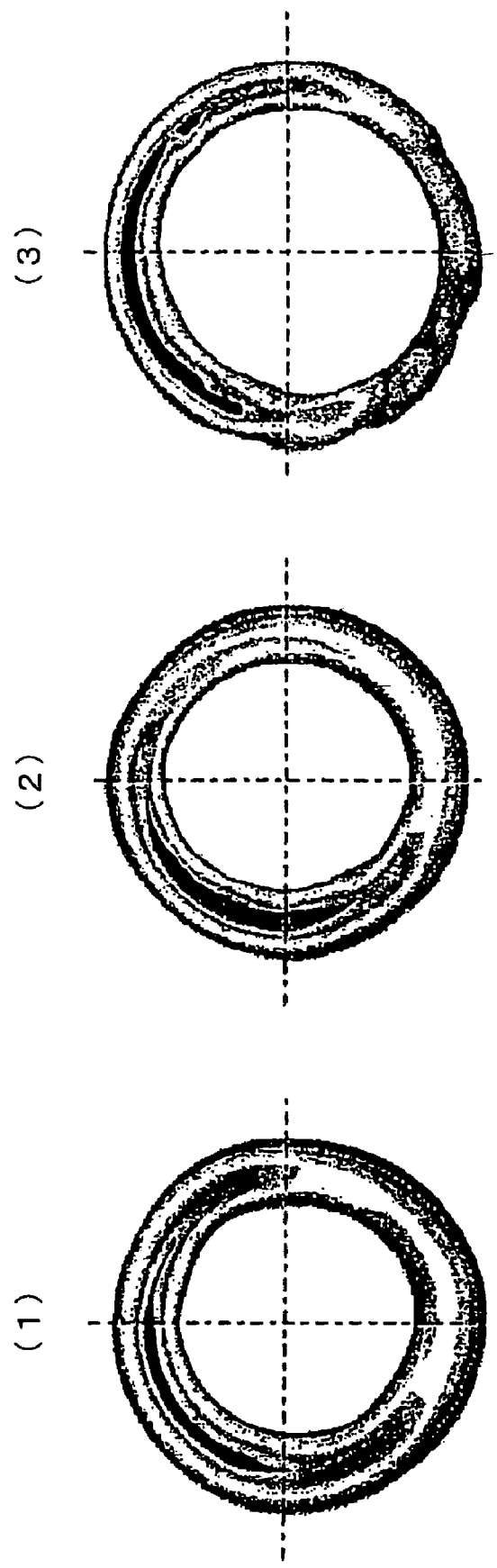
FIGS. 20(1) to 20(3) are explanatory diagrams showing fuel distribution densities at the exit of the orifice when a seat angle is respectively 60°, 70° and 80°.

FIGS. 20(1) to 20(3) show fuel distribution densities at the exit of the orifice when a valve seat angle is 60°, 70° and 80°. The divergence angle of the fuel concentrated portion becomes wider as the valve seat angle increases. However, the sensitivity to the divergence angle of the valve seat is lower in comparison with other factors (deflection angle and eccentric amount of the orifice). The valve seat angle is set to, e.g., about 70°.

According to the present embodiment, the fuel spray F injected from the orifice is formed to be deflected to the axis of the injector 10, and the penetration length of the fuel spray is nonuniform (L1/L2≠1). The penetration of lead spray and the divergence angle of the lead spray can be increased to about 3 times in comparison with the case of a conventional injector with an L-shaped step portion(the center line of the injection orifice corresponds with the central axis of the injector 1).

In the fuel injection valve according to the invention, the fuel concentrated area (the most penetration area; the largest lead spray area) in the fuel spray can be set in an arbitrary position around the central axis of the injection orifice. Further, the spray shape and the spray distribution can be adjusted by the step at the outlet (end surface) of the injection orifice. By the combination of these settings, various settings of the fuel spray direction, the fuel spray shape, the penetration length, the existence/absence of lead spray and the like can be made.

What is claimed is:

1. A fuel injection valve having an injection orifice for injecting fuel, a movable valve element for opening and closing said injection orifice by the motion of its axial direction, and a fuel swirling means for giving swirling force to fuel passing through a fuel passage at the upper stream of said injection orifice,
wherein said injection orifice is slanted with a predetermined deflection angle in relation to the central axis of said valve element, and the outlet of said injection orifice is formed in the shape of a step.

2. The fuel injection valve according to claim 1, wherein two faces composing said step are formed in parallel mutually.

3. The fuel injection valve according to claim 1, wherein two faces composing said step are formed by cutting or pressing.

4. A direct-fuel injection type engine comprising:
an engine:
an ignition plug for combustion, and
a fuel injection valve for injecting pressurized fuel directly into a combustion chamber of the engine,
wherein the fuel injection valve has an injection orifice for injection fuel, a valve seat provided at the upper stream of said injection orifice, a movable valve element for opening and closing said injection orifice, and a fuel swirler for giving a swirling force at the upper stream of said injection orifice to the fuel passing through the injection valve, and
wherein said injection orifice is slanted with a predetermined deflection angle in relation to the central axis of said valve element, and the outlet of said injection orifice is formed with the shape of a step.

5. The direct-fuel injection type engine according to claim 4, wherein two faces composing said step are formed in parallel mutually.

6. The direct-fuel injection type engine according to claim 4, wherein two faces composing said step are formed by cutting or pressing.

7. The direct-fuel injection type engine according to claim 5, wherein two faces composing said step are formed by cutting or pressing.

8. A method of manufacturing a fuel injection valve having an injection orifice for injecting fuel, a movable valve element for opening and closing said injection orifice by the motion of its axial direction, a fuel swirling means for giving swirling force to fuel passing through a fuel passage at the upper stream of said injection orifice, said method having the following processing of a nozzle member in said injection valve;

making said injection orifice, in primary product of said nozzle member, with a predetermined slant angle in relation to the central axis of said nozzle body and with a length including an adjustment margin;

adjusting the length of said injection orifice by cutting or pressing the outlet of said injection orifice, forming a step at the outlet of said injection orifice after determining the direction of said step.

9. The method according to claim 8, wherein said forming of said step is performed by cutting or pressing.

10. A fuel injection valve having an injection orifice for injecting fuel, a valve seat provided at the upper stream of said injection orifice, a valve element for opening and closing said injection orifice, and a fuel swirling element for giving a swirling force to the fuel passing through a fuel passage at the upper stream of the valve seat, wherein said injection orifice is formed at a nozzle member with a predetermined deflection angle in relation to the central axis of a injection valve body so as to make a locally concentrating flow in swirling flow passing through its orifice; and the outlet of said injection orifice is provided with a notch so that the position of said notch corresponds with the injection position of said locally concentrating flow.

11. The fuel injection valve according to claim 10, wherein said notch of the outlet of said injection orifice is formed by cutting or pressing.

12. The fuel injection valve according to claim 10, wherein said notch of the outlet of said injection orifice is configured with the shape of a step having a difference in level in the axial direction of said injection orifice.

13. The fuel injection valve according to claim 10, wherein the periphery of the outlet of said injection orifice projects from its surroundings plane surface; said projecting periphery has two slopes slanting on the basis of a plane perpendicular to the axis of said injection valve; said slopes configures a difference in level at the outlet of said injection; and a lower one of said slopes forms said notch of the outlet of said injection orifice.

14. The fuel injection valve according to claim 10, wherein said notch of the outlet of said injection orifice is formed on the opposite side to the deflection direction of said injection orifice.

15. A fuel injection valve having an injection orifice for injecting fuel and a fuel swirling element for giving a swirling force to the fuel passing through a fuel passage at the upper stream of said injection orifice, wherein the orientation of a fuel spray injected from said injection orifice is deflected in a definite direction on the basis of the central axis of an injection valve body, and spray penetration (the reachable distance) of a fuel spray area at another side opposite to the deflected side is set at a maximum length in said fuel spray, wherein measured under atmospheric pressure.

16. A direct-fuel injection type engine comprising
an engine;
an ignition plug for combustion; and
a fuel injection valve for injecting pressurized fuel directly into a combustion chamber of the engine,
wherein
said fuel injection valve has an injection orifice, for injecting fuel, a valve seat provided at the upper stream of said injection orifice, a valve element for opening and closing said injection orifice, and a fuel swirling element for giving a swirling force at the upper stream of the valve seat to the fuel passing through the said injection valve,
the injection orifice is provided at a nozzle member and has a predetermined deflection angle in relation to the central axis of a injection valve body so as to make a locally concentrating flow in swirling flow passing through the orifice, and the outlet of said injection orifice is provided with a notch so that the position of said notch corresponds with the injection position of said locally concentrating flow,
said injection valve is provided slanting downward at the upper part of each cylinder of said engine, and
the deflection direction of said injection orifice is directed to the ignition plug side on the basis of the central axis of said injection valve body, and said notch formed at the outlet of said injection orifice is directed to the piston side of said engine.

17. A direct-fuel injection type engine comprising:
an ignition plug for combustion; and
a fuel injection valve for injecting pressurized fuel directly into a combustion chamber of the engine,
wherein
said fuel injection valve has an injection orifice for injecting fuel, a valve seat provided at the upper stream of said injection orifice, a movable valve element for opening and closing said injection orifice, and a fuel swirling element for giving a swirling force at the upper stream of the valve seat to the fuel passing through the said fuel injection valve,
the injection orifice is provided at a nozzle member and has a predetermined deflection angle in relation to the central axis of a injection valve body so as to make a locally concentrating flow in swirling flow passing through the orifice; and the outlet of said injection orifice is provided with a notch so that the position of said notch corresponds with the injection position of said locally concentrating flow,
said injection valve is provided slanting downward at the upper part of each cylinder of said engine,
the deflection direction of said injection orifice is directed to the piston side of said engine on the basis of the central axis of said injection valve body, said notch formed at the outlet of said injection orifice is directed to the ignition plug side.

* * * * *